US008655858B1

(12) United States Patent
Chidambaram et al.

(10) Patent No.: US 8,655,858 B1
(45) Date of Patent: Feb. 18, 2014

(54) DIGITAL CONTENT RECONSTRUCTION AND DISTRIBUTION

(75) Inventors: Palanidaran Chidambaram, Chennai (IN); Priyank Porwal, Chennai (IN); Ramesh Muthiah, Duluth, GA (US); Lakshmi S. Nidamarthi, Issaquah, WA (US); Nader M. Kabbani, Seattle, WA (US); Danielle Cuff Langdon, Seattle, WA (US); Biren Mowli, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 540 days.

(21) Appl. No.: 12/270,741

(22) Filed: Nov. 13, 2008

(51) Int. Cl.
*G06F 7/00* (2006.01)
*G06F 17/00* (2006.01)

(52) U.S. Cl.
USPC .......................................... 707/695; 707/802

(58) Field of Classification Search
None
See application file for complete search history.

(56) References Cited

U.S. PATENT DOCUMENTS

| | | | | |
|---|---|---|---|---|
| 5,623,652 | A * | 4/1997 | Vora et al. | 707/742 |
| 6,088,710 | A * | 7/2000 | Dreyer et al. | 715/246 |
| 6,199,082 | B1 * | 3/2001 | Ferrel et al. | 715/205 |
| 6,331,867 | B1 * | 12/2001 | Eberhard et al. | 715/864 |
| 6,345,256 | B1 * | 2/2002 | Milsted et al. | 705/64 |
| 6,845,378 | B1 * | 1/2005 | Pauly et al. | 1/1 |
| 7,020,654 | B1 * | 3/2006 | Najmi | 1/1 |
| 7,038,807 | B1 * | 5/2006 | Karres | 358/1.18 |
| 7,085,755 | B2 * | 8/2006 | Bluhm et al. | 1/1 |
| 7,191,398 | B2 * | 3/2007 | Nitta et al. | 715/205 |
| 7,222,306 | B2 * | 5/2007 | Kaasila et al. | 715/801 |
| 7,340,481 | B1 * | 3/2008 | Baer et al. | 1/1 |
| 7,346,668 | B2 * | 3/2008 | Willis | 709/219 |
| 7,360,166 | B1 * | 4/2008 | Krzanowski | 715/767 |
| 7,437,351 | B2 * | 10/2008 | Page | 1/1 |
| 7,483,871 | B2 * | 1/2009 | Herz | 1/1 |
| 7,716,224 | B2 * | 5/2010 | Reztlaff et al. | 707/741 |
| 7,877,460 | B1 * | 1/2011 | Brouwer et al. | 709/217 |
| 8,266,064 | B1 * | 9/2012 | Kumar | 705/64 |
| 8,301,622 | B2 * | 10/2012 | Green et al. | 707/722 |
| 8,306,356 | B1 * | 11/2012 | Bever et al. | 382/275 |
| 8,316,449 | B2 * | 11/2012 | Ginter et al. | 726/26 |
| 2002/0042790 | A1 * | 4/2002 | Nagahara | 707/4 |
| 2002/0152215 | A1 * | 10/2002 | Clark et al. | 707/10 |
| 2003/0182450 | A1 * | 9/2003 | Ong et al. | 709/246 |
| 2004/0133847 | A1 * | 7/2004 | Iino et al. | 715/500 |
| 2004/0148274 | A1 * | 7/2004 | Warnock et al. | 707/2 |
| 2005/0022113 | A1 * | 1/2005 | Hanlon | 715/511 |

(Continued)

OTHER PUBLICATIONS

E Ink—Wikipedia, the free encyclopedia, retrieved on Jul. 27, 2011 at <<http://en.wikipedia.org/wiki/E_ink>>, 4 pages.

(Continued)

*Primary Examiner* — Wilson Lee
*Assistant Examiner* — Jessica N Le
(74) *Attorney, Agent, or Firm* — Lee & Hayes, PLLC

(57) ABSTRACT

An item providing system may receive digital content that is to be provided to user devices. The digital content may include electronic periodicals (e.g., electronic newspapers, electronic magazines, etc.). The digital content may not be complete. To address this issue, the item providing system may include a content reconstruction tool that is able to identify and download needed portions of digital content. Also, the digital content may not be in a desired format. The item providing system may include a collator tool that is able to organize, arrange and/or format the digital content.

39 Claims, 12 Drawing Sheets

(56) References Cited

U.S. PATENT DOCUMENTS

| | | | |
|---|---|---|---|
| 2005/0096938 | A1* | 5/2005 | Slomkowski et al. ............ 705/1 |
| 2006/0116967 | A1* | 6/2006 | Koike et al. ................... 705/59 |
| 2007/0083571 | A1* | 4/2007 | Meller et al. ................ 707/203 |
| 2008/0066080 | A1* | 3/2008 | Campbell ................... 719/314 |
| 2008/0148123 | A1* | 6/2008 | Pendakur et al. ............ 714/748 |
| 2008/0168135 | A1* | 7/2008 | Redlich et al. ............... 709/204 |
| 2008/0243828 | A1* | 10/2008 | Reztlaff et al. ................. 707/5 |
| 2008/0294674 | A1* | 11/2008 | Reztlaff et al. .............. 707/102 |
| 2009/0125413 | A1* | 5/2009 | Le Chevalier et al. .......... 705/26 |
| 2009/0241015 | A1* | 9/2009 | Bender et al. ................ 715/202 |
| 2010/0228719 | A1* | 9/2010 | Apparao et al. .............. 707/709 |

OTHER PUBLICATIONS

Electronic paper—Wikipedia, the free encyclopedia, retrieved on Jul. 27, 2011 at <<http://en.wikipedia.org/wiki/Electronic_paper>>, 14 pages.

* cited by examiner

DIGITAL CONTENT RECONSTRUCTION AND DISTRIBUTION

BACKGROUND

Electronic distribution of information has gained in importance with the proliferation of personal computers and has undergone a tremendous upsurge in popularity as the Internet has become widely available. With the widespread use of the Internet, it has become possible to distribute large, coherent units of information using electronic technologies.

Advances in electronic and computer-related technologies have permitted computers to be packaged into smaller and more powerful electronic devices. An electronic device may be used to receive and process information. The electronic device may provide compact storage of the information as well as ease of access to the information. For example, a single electronic device may store a large quantity of information that might be downloaded at any time via the Internet. In addition, the electronic device may be backed up, so that physical damage to the device does not necessarily correspond to a loss of the information stored on the device.

In addition, a user may interact with the electronic device. For example, the user may read information that is displayed by the electronic device. Further, the user may instruct the device to display a specific piece of information stored on the electronic device. The information content and formatting of such content are important for the user's reading experience using the device. Benefits may be realized from improved systems and methods for digital content reconstruction and distribution.

DETAILED DESCRIPTION

Figure 1:
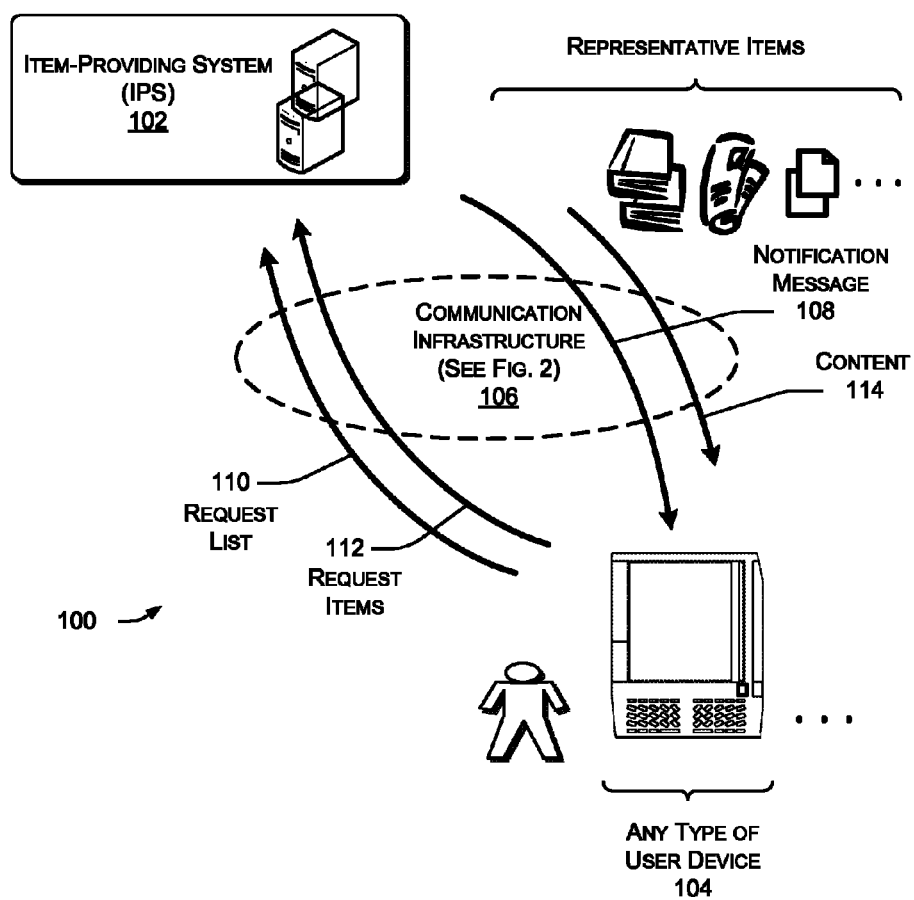
FIG. 1 is a block diagram illustrating a system for downloading items from an Item Providing System (IPS) to a user device.

According to one illustrative implementation, this disclosure sets forth functionality for obtaining items, processing these items, and then downloading items to a user device. The functionality may be manifested in various systems, modules, computer-readable media, data structures, methods, and other forms.

One aspect of the present disclosure relates to techniques for organizing, arranging and/or formatting digital content that is provided to user devices. Digital content may include electronic periodicals, such as electronic newspapers, electronic magazines, etc. There are a variety of reasons why it may be desirable to organize, arrange and/or format digital content. For example, it may be desirable to provide an online newspaper edition that substantially matches the hard copy version of the newspaper. In this situation, the electronic version of the newspaper may be rearranged and/or reformatted so that it matches the hard copy version of the newspaper. In accordance with the present disclosure, a collator tool may be provided that is able to organize, arrange and/or format digital content.

Another aspect of the present disclosure relates to techniques for reconstructing digital content that, for whatever reason, may not be complete. Examples of digital content that are not complete include an entire electronic newspaper missing, one or more articles missing, information in the articles missing, etc. In accordance with the present disclosure, a content reconstruction tool may be provided that is able to identify and download needed portions of digital content.

As used herein, the term "item" may correspond to any type of digital content or electronic content. The terms "item" and "digital content" are used interchangeably herein. In one case, an item may correspond to a digital media item. A media item may include, without limitation, text content, image content, audio content, video content, hypertext protocol content, and so on, or any combination of these kinds of content. In addition, or alternatively, an item may include instruction-bearing content, such as machine-readable program code, markup language content, script content, and so forth. For instance, an item may correspond to a software upgrade or the like.

More specifically, in one case, the term "item" may refer to a specific unit of merchandisable content, such as a book (e.g., an "eBook"), an issue of a magazine, and so on. Alternatively, an item may refer to smaller parts of a merchandisable unit, such as a chapter of a book or a song in an album. Alternatively, an item may refer to a larger compilation of component items that are related in any manner. For instance, an item may refer to multiple issues of a magazine in a particular year.

In general, the various features described in the implementations may be regarded as optional features, meaning that these features may be omitted or replaced with other features. Further, the various implementations described herein may be supplemented by adding additional features.

FIG. 1 is a block diagram illustrating a system 100 for downloading items from an Item Providing System (IPS) 102 to a user device 104. At the device 104, the user may consume the media items in electronic form, as opposed to traditional hard copy form. Although not shown, the user device 104 represents one of a potentially great number of user devices.

As explained above, the terms "item" and "digital content" have broad connotation. The following list, which is non-exhaustive, identifies representative types of items or digital content.

An item may correspond to an eBook item. An eBook item, in turn, may refer to a book in electronic form or to one or more portions of a book (such as a chapter of a book) or to a compilation of multiple books (such as a book series), and so on. An eBook is an example of a general class of items referred to herein as pre-generated items. The term pre-generated item refers to content typically (although not necessarily) provided to a user in response to the user's on-demand request for the content after it has been received and stored by the IPS 102.

An item of content may also correspond to a subscription-related item. A subscription-related item refers to any item the user receives based on a schedule or based on some other type of pre-established arrangement. Without limitation, representative forms of subscription-related items include magazines, journals, newspapers, newsletters, and so on. Other forms of subscription-related items include electronic feeds of various types, such as Really Simple Syndication (RSS) feeds, and so on. In contrast to a pre-generated item, a subscription-related item is typically provided to a user in response to the receipt of the item by the IPS 102, rather than the user's on-demand request for a pre-generated item.

An item may also correspond to a personal document item, or simply "personal item." A personal item refers to a document the user forwards in advance to the IPS 102, whereupon the IPS 102 converts the item to a device-readable format.

An item may also correspond to audio content, such as a piece of music, a collection of music, an audio book, and so on. An item may also correspond to a bundle of information generated in response to a query made by the user. An item may also correspond to instruction-bearing content, such as a software update. An item may also correspond to advertising material downloaded to the user device by any entity or combination of entities. Various rules may be applied to govern the downloading of this type of item.

An item may also correspond to a sample of a more complete version of the item. In one case, a sample-type item may embed one or more links to allow the user to acquire its full-version counterpart, or another part (e.g., chapter) of the item. In another case, a publisher or author may release an eBook or other item in a series of installments. Each installment may be regarded as an item.

The item-providing system (IPS) 102 corresponds to any functionality or combination of functionality for forwarding items to the user device 104. In one case, the IPS 102 may correspond to network-accessible server-based functionality, various data stores, and/or other data processing equipment. The IPS 102 may be implemented by a single collection of functionality provided at a single physical site. Alternatively, the IPS 102 may be implemented by multiple collections of functionality, optionally provided at plural physical sites. The IPS 102 may be administered by a single entity or plural entities.

In one case, the IPS 102 corresponds to an entity that provides items to users upon the users' purchase of the items. In this role, the IPS 102 may essentially act as a bookseller or the like. In one particular commercial environment, the IPS 102 may also offer services that allow users to purchase hard-copy books for physical delivery to the users. In this context, the IPS 102 may allow users to download electronic items to respective user devices as part of its entire suite of services. In other cases, the IPS 102 corresponds to an entity that provides items to users on a non-fee basis or on the basis of some other type of alternative compensation arrangement. Thus, the term "provider" of items should be construed broadly to encompass educational institutions, governmental organizations, libraries, non-profit organizations, and so on, or some cooperative combination of any two or more entities.

The user device 104 corresponds to any type of electronic processing device 104 for receiving items from the IPS 102. In one implementation, the user device 104 is readily portable, meaning the user may freely carry the user device 104 from one location to another. In one particular case, the user device is designed as a book reader device, also known as an eBook reader device. In this case, the user device 104 functions as the electronic counterpart of a paper-based book. The user may hold the user device 104 in a manner similar to a physical book; the user may electronically turn the pages of the book, and so on.

Without limitation, FIG. 1 illustrates a particular type of eBook reader device. Additional details regarding this particular type of reader device are provided below. Alternatively, the user device 104 may correspond to any other type of portable device, such as a portable music player, a personal digital assistant (PDA), a mobile telephone, a game module, a laptop computer, and so on, and/or any combination of these types of devices. Alternatively, or in addition, the user device 104 may correspond to a device which is not readily portable, such as a personal computer, a set-top box associated with a television, a gaming console, and so on.

A communication infrastructure 106 bi-directionally couples the IPS 102 to the user device 104. Namely, the IPS 102 downloads items, upgrades, and/or other information to the user device 104 via the communication infrastructure 106. The IPS 102 receives various instructions and other data from the user device 104 via the communication infrastructure 106.

The communication infrastructure 106 may include any combination of communication functionality, including any combination of hardwired links and/or wireless links, etc. For instance, FIG. 2 (to be discussed below in turn) shows one implementation of the communication infrastructure 106 that includes a combination of a wide area network (WAN) and wireless infrastructure. By virtue of the wireless component of the communication infrastructure 106, the user may use the user device 104 to purchase items and consume items without being tethered to the IPS 102 via hardwired links. Thus, for instance, a user may purchase and consume an eBook using the device while riding in a car as a passenger, while hiking in a park, while boating on a lake, and so forth.

FIG. 1 shows four exchanges that describe, in very high-level form, part of a procedure for downloading items to the user. In a first message 108, the IPS 102 may send a notification message to the user device 104. The notification message 108 instructs the user device 104 to download one or more items from the IPS 102 and/or perform other actions. In a second message 110, the user device 104 requests the IPS 102 to supply a list which identifies one or more items to be downloaded (and/or other actions to be performed, such as, in one case, sending information back to the IPS 102).

The user device 104 receives the list from the IPS 102 in response to the second message 110 (note FIG. 1 does not specifically identify the transmission of the list from the IPS 102 to the user device 104). If the instructions identify items to be downloaded, in a third message 112, the user device 104 sends a request to the IPS 102, asking the IPS 102 to download the items identified in the list. In a fourth message 114, the IPS 102 downloads the requested items to the user device 104. In effect, the user device 104 retrieves the items using a pull approach, but the pull approach is initiated by a push operation (by virtue of the IPS 102 "pushing" a notification message 108 to the user device 104).

Figure 2:
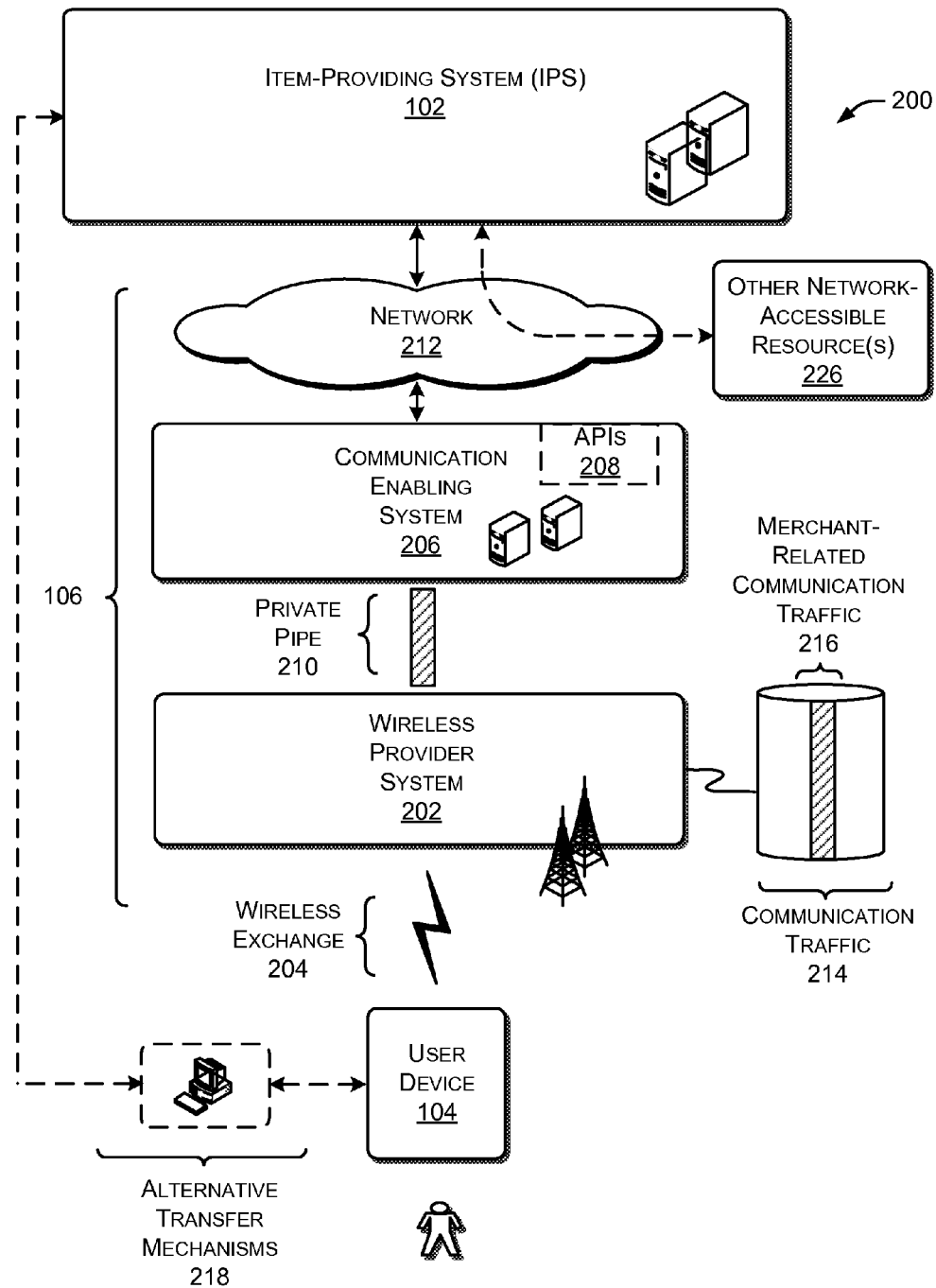
FIG. 2 shows a system which represents one illustrative implementation of the general system of FIG. 1.

FIG. 2 shows a system 200 that represents one illustrative implementation of the general system 100 of FIG. 1. By way of overview, the system 200 includes the components identified above, namely IPS 102 coupled to a user device 104 via communication infrastructure 106.

The communication infrastructure 106 may include multiple components. A first component may be a wireless provider system 202. The wireless provider system 202 corresponds to any infrastructure for providing a wireless exchange 204 with the user device 104. In one case, the wireless provider system 202 is implemented using various data processing equipment, communication towers, and so forth (not shown).

Alternatively, or in addition, the wireless provider system 202 may rely on satellite technology to exchange information with the user device 104. The wireless provider system 202 may use any form of electromagnetic energy to transfer signals, such as, without limitation, radio-wave signals. The wireless provider system 202 may use any communication technology to transfer signals, such as, without limitation, spread spectrum technology, implemented, for instance, using the Code Division Multiple Access (CDMA) protocol. The wireless provider system 202 may be administered by a single entity or by a cooperative combination of multiple entities.

The communication infrastructure 106 may also include a communication-enabling system 206. One purpose of the communication-enabling system 206 is to serve as an intermediary in passing information between the IPS 102 and the wireless provider system 202. The communication-enabling system 206 may be implemented in any manner, such as, without limitation, by one or more server-type computers, data stores, and/or other data processing equipment.

The communication-enabling system 206 may communicate with the wireless provider system 202 via a dedicated channel 210, also referred to as a dedicated communication pipe or private pipe. The channel 210 is dedicated in the sense it is exclusively used to transfer information between the communication-enabling system 206 and the wireless provider system 202. In contrast, the communication enabling system 206 communicates with the IPS 102 via a non-dedicated communication mechanism, such as a public Wide Area Network (WAN) 212. For example, the WAN 212 may represent the Internet.

The users may access the IPS 102 through alternative communication routes which bypass the wireless provider system 202. For instance, as indicated by alternative access path 218, a user may use a personal computer or the like to access the IPS 102 via the wide area network 212, circumventing the wireless provider system 202 and the communication-enabling system 206. The user may download items through this route in conventional fashion. The user may then transfer the items from the personal computer to the user device 104, e.g., via a Universal Serial Bus (USB) transfer mechanism, through the manual transfer of a portable memory device, and so on. This mode of transfer may be particularly appropriate for large files, such as audio books and the like. Transferring such a large amount of data in wireless fashion may have a relatively high cost. However, the system 200 may also be configured to transfer large files (such as audio files) via the wireless exchange 204.

Figure 3:
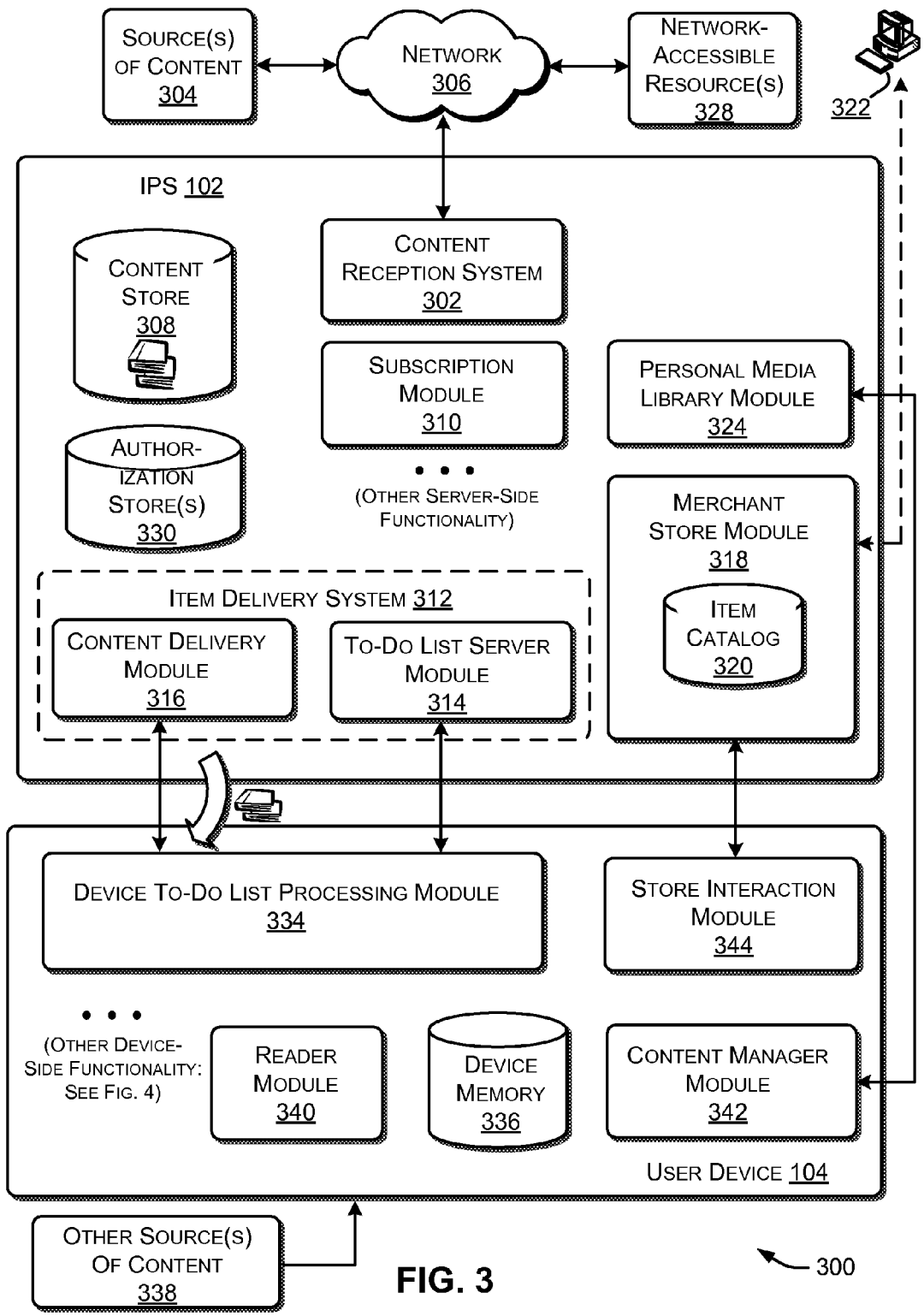
FIG. 3 shows a system including a more detailed depiction of the IPS and the user device.

FIG. 3 shows a system 300 including a more detailed depiction of the IPS 102 and the user device 104 (which were introduced in FIGS. 1 and 2). Although not shown, the system 300 shown in FIG. 3 may use the wireless features shown in FIG. 2.

In another implementation, the system 300 may use some other communication infrastructure than is shown in FIG. 2, which may optionally omit the use of wireless communication.

Addressing the details of the IPS 102 first, this system 102 performs various functions. Different modules are associated with these different functions. One module is a content reception system 302. The content reception system 302 receives content from one or more sources of content 304. The sources 304 may represent any type of provider of content, such as eBook publishers, newspaper publishers, other publishers of periodicals, various feed sources, music sources, and so on.

The sources 304 may be administered by a single entity or may be administered by separate respective entities. Further, the entity administering the IPS 102 may correspond to a same entity that administers one or more of the sources 304. Alternatively, or in addition, the entity administering the IPS 102 may interact with one or more different entities administering one or more respective sources 304. In the latter case, the entity administering the IPS 102 may enter into an agreement with the source entities to receive content from these source entities.

In the above example, the entities associated with the sources 304 may correspond to commercial organizations or other types of organizations. In another case, one or more of the sources may correspond to individual users, such as the creators of the items. For example, a user may directly provide items to the IPS 102. Alternatively, or in addition, a user may supply content to a community repository of items, and the IPS 102 may receive content from this repository, and so on.

The content reception system 302 may obtain the content through various mechanisms. In one case, the content reception system 302 obtains the content via one or more networks 306. The networks 306 may represent a WAN, such as the Internet, a Local Area Network (LAN), or some combination thereof. The content reception system 302 may receive the information in various forms using any protocol or combination of protocols. For instance, the content reception system 302 may receive the information by making a Hypertext Transfer Protocol (HTTP) request, by making a File Transfer Protocol (FTP) request, by receiving a feed (e.g., an RSS feed), and so forth.

In another case, the IPS 102 may obtain content via a peer-to-peer (P2P) network of sources 304. More generally, the content reception system 302 may proactively request the content in an on-demand manner (based on a pull method of information transfer) or the content reception system 302 may receive the content in response to independent transfer operations initiated and performed by the sources 304 (based on a push method of information transfer). Alternatively, the content reception system 302 may use a combination of pull and push transfer mechanisms to receive the content.

The content reception system 302 may receive content in the form of items. Without limitation, the items may include eBooks, audio books, music, magazine issues, journal issues, newspaper editions, various feeds, and so forth. In one case, the content reception system 302 may receive some items expressed in a format not readable by the user device 104 (where the user device may optionally be configured to receive, process, and present content expressed in one or more predefined formats). To address this situation, the content reception system 302 may convert the items from their original format into a device-readable format (such as, without limitation, the .MOBI format).

The content reception system 302 stores the items received (and optionally converts them to another format) in a content store 308. The content store 308 includes one or more storage systems for retaining items in electronic form, located at a single site or distributed over plural sites, administered by one or more entities.

The IPS 102 also includes a subscription module 310. The subscription module 310 manages users' subscriptions to subscription-related items. Generally, a subscription entitles a user to receive one or more subscription-related items (which are yet to be received and stored by the content reception system 302) based on any type of consideration or combination of considerations. Without limitation, subscription-related item types include magazines, journals, newsletters, newspapers, various feeds, and so forth. Users may arrange to receive subscription-related items by purchasing such subscriptions, or, more generally, by registering to receive such subscriptions (which, in some cases, may not involve the payment of a fee).

Alternatively, or in addition, the IPS 102 may automatically register users to receive subscription-related items without the involvement of the users (and possibly without the approval of the users). The latter scenario may be appropriate in the case in which the IPS 102 (or some other entity) registers a user to receive unsolicited advertisements, newsletters, and so on. The system 300 may allow the user to opt out of receiving such unsolicited information.

The IPS 102 may consult the subscription module 310 to determine which user devices should receive a newly-received subscription-related item. For instance, upon receiving an electronic issue of the magazine Forbes, the IPS 102 consults the subscription module 310 to determine the users who have paid to receive this magazine. The IPS 102 then sends the issue to the appropriate user devices.

An item delivery system 312 represents the functionality which actually performs the transfer of content to the user device 104. In one illustrative representation, the item-delivery system 312 includes two components: a to-do list server module 314 and a content delivery module 316. The to-do list server module 314 generally provides instructions for the user device 104. The instructions direct the user device 104 to retrieve items and perform other operations. The content delivery module 316 allows the user device 104 to obtain the items identified in the instructions received from the to-do list server module 314.

More specifically, in a first phase of information retrieval, the to-do list server module 314 sends a notification message to the user device 104. The user device 104 responds to the notification message by waking up (if "asleep"), which may involve switching from a first power state to a second power state (where the second power state consumes more power than the first power state).

The user device 104 may then contact the to-do list server module 314 to request instructions from the to-do list server module 314. More specifically, for each user device, the to-do list server module 314 maintains a list of entries, also referred to herein as a "to-do queue." An entry provides an instruction for a user device to perform an action. As will be described in greater detail below, there are different instructions that a device may be directed to perform, wherein a collection of instructions defines an IPS-device interaction protocol. One such action (e.g., associated with a GET instruction of the protocol) directs the user device 104 to retrieve an item from a specified location by specifying an appropriate network address (e.g., a URL) and appropriate arguments.

In a first phase of the downloading procedure, the user device 104 may retrieve n such entries, wherein n is an integer. In one scenario, the number n may be a subset of a total number of items in the to-do queue associated with the user device 104. In a second phase of the downloading procedure, the user device 104 may contact the content delivery module 316 to retrieve one or more items identified in the GET-related entries.

In general, after receiving the notification message, the item delivery system 312 may interact with the user device 104 in a data mode, e.g., using the Hypertext Transfer Protocol (HTTP), or some other protocol or combination of protocols.

The IPS 102 may also include a merchant store module 318. The merchant store module 318 may provide access to an item catalog 320, which, in turn, may provide information regarding a plurality of items (such as eBooks, audio books, subscription related items, and so on). As will be described in greater detail below, the merchant store module 318 may include functionality allowing a user to search and browse though the item catalog 320. The merchant store module 318 may also include functionality allowing a user to purchase items (or, more generally, acquire items based on any terms).

In one case, a user may interact with the merchant store module 318 via the user device 104 using wireless communication. Alternatively, or in addition, the user may interact with the merchant store module 318 via another type of device 322, such as a personal computer, optionally via wired links. In either case, when the user purchases or otherwise acquires an item via the merchant store module 318, the IPS 102 may invoke the item delivery system 312 to deliver the item to the user.

The IPS 102 may also include a personal media library module 324. The personal media library module 324 may store, for each user, a list of the user's prior purchases. More specifically, in one case, the personal media library module 324 may provide metadata information regarding eBook items and other on-demand selections (e.g., "a la carte" selections, such as subscription issues, etc.) which a user already owns. The personal media library module 324 may also provide links to the items in the content store 308. As will be described in greater detail below, to download an eBook item (or the like) which the user has already purchased, the user device 104 contacts the content delivery module 316.

The content delivery module 316 may interact with permission information and linking information in the personal media library module 324 in order to download the item to the user. In one use scenario, the user device 104 may access the content delivery module 316 in this manner to initiate downloading of an item that has been previously purchased by the user but has been deleted by the user device 104 for any reason.

The IPS 102 may also include various security-related features, such as one or more authorization stores 330. The authorization stores 330 may provide information that enables various components of the IPS 102 to determine whether to allow the user to perform various functions, such as access the merchant store module 318, download items, change settings, and so on.

The above-enumerated list of modules is representative and is not exhaustive of the types of functions performed by the IPS 102. As indicated by the label "Other Server-Side Functionality," the IPS 102 may include additional functions, many of which are described below.

Now turning to the device-side features of the system 300, the user device 104 may include a device to-do list processing module 334. The purpose of the device to-do list processing module 334 may be to interact with the item delivery system 312 to download items from the item delivery system 312. Namely, in a first phase of the downloading procedure, the device to-do list processing module 334 may first receive a notification message from the to-do list server module 314, which prompts it to wake up (if "asleep") and contact the to-do list server module 314 to retrieve a set of n entries.

Each entry may include an instruction that directs the device to-do list processing module 334 to perform an action. In a second phase, for a GET-type entry, the device to-do list processing module 334 may contact the content delivery module 316 to request and retrieve an item identified by the GET-type entry. As will be described in greater detail below, the user device 104 may signal a successful completion of the download process or a failure in the download process.

Upon downloading an item, the user device 104 may store the item in a device side memory 336, which in one example is a flash-type memory and may be any other type of memory in other examples. Although not shown, the user device 104 may also exchange information with any other source of content 338. In one illustrative case, the other source of content 338 may represent a personal computer or other data processing device. Such other source of content 338 may transfer an item to the user device 104 via a Universal Serial Bus (USB) connection and/or any other type(s) of connection (s). In this scenario, the other source of content 338, in turn, may receive the item from the IPS 102 (or other source) via hardwired connection (e.g., non-wireless connection). For example, to receive an audio book, the user may use a personal computer to non-wirelessly download the audio book from a network-accessible source of such content. The user may then transfer the audio book to the user device 104 via USB connection. In another illustrative case, the other source of content 338 may represent a portable memory module of any type, such as a flash type memory module, a magnetic memory module, an optical memory module, and so on.

The user device 104 may also include a reader module 340. The illustrative purpose of the reader module 340 is to present media items for consumption by the user using the user device 104. For example, the reader module 340 may be used to display an eBook to the user to provide a user experience that simulates the reading of a paper-based physical book.

The user device 104 may also include a content manager module 342. The purpose of the content manager module 342 is to allow the user to manage items available for consumption using the user device 104. For example, the content manager module 342 may allow the user to view a list of items available for consumption.

The content manager module 342 may also identify the sources of respective items: one such source corresponds to the device-side memory 336; another source corresponds to an attached portable memory (e.g., represented by the other source 338); another source corresponds to items identified in the personal media library module 324 (as may be revealed, in turn, by device-side metadata provided by the IPS 102); another source corresponds to subscription-related items identified by the subscription module 310, and so on. The content manager module 342 may allow the user to filter and sort the items in various ways. For example, the user may selectively view items which originate from the device-side memory 336.

The user device 104 may also include a store interaction module 344. The store interaction module 344 may allow the user device 104 to interact with the merchant store module 318. The user may engage the store interaction module 344 to search and browse through items, to purchase items, to read and author customer reviews, and so on. As described above, the user may also use a personal computer or the like to interact with the merchant store module 318 via hardwired links.

Figure 4:
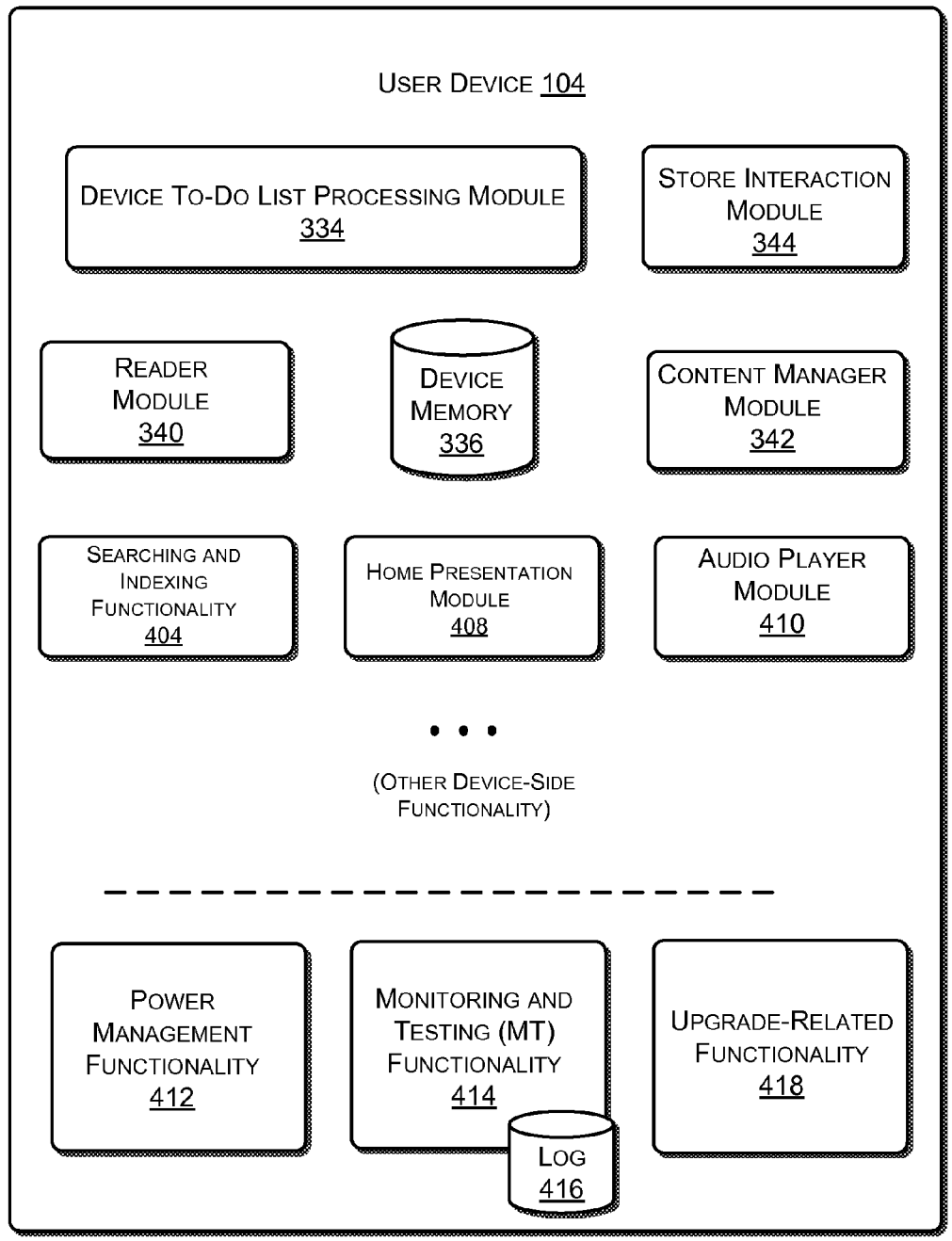
FIG. 4 shows one configuration of the user device.

The above-enumerated list of modules is representative and is not exhaustive of the types of functions performed by the user device 104. As indicated by the label "Other Device-Side Functionality," the user device 104 may include additional functions, many of which are described below. In fact, FIG. 4 shows additional device-side functionality. For completeness, FIG. 4 also identifies the various modules described above, including the device to-do list processing module 334, the device memory 336, the reader module 340, the content manager module 342, and the store interaction module 344. These features perform the functions described above.

FIG. 4 shows one configuration of the user device 104. The user device 104 may include searching and indexing functionality 404. The indexing aspect of this functionality 404 provides a mechanism for indexing an item received from the IPS 102 and/or for interacting with an index generated and supplied by the IPS 102 or by some other source. An index for a particular item (such as an eBook or newspaper edition) identifies the component parts (e.g., words) in the item, linking the component parts to their respective locations in the item. The searching aspect of the functionality 404 provides a mechanism for searching for identified components (e.g., words, phrases, etc.) in an item, and for performing other search-related functions. The searching aspect relies on the indexing aspect.

The user device 104 may also include a home presentation module 408. The home presentation module 408 may provide a home page when the user first turns on the user device and/or at other junctures. The home page may act as a general portal allowing a user to access media items and various features provided by the user device 104. In one illustrative case, the home page may present a summary of some (or all) of the items available for consumption using the user device 104.

The user device 104 may also include an audio player module 410. The audio player module 410 may provide an interface which allows the user to play back and interact with audio items, such as music, audio books and the like.

The above-described features of the user device 104 may pertain to applications with which the user may interact or which otherwise play a high-level role in the user's interaction with the user device 104. The user device 104 may include a number of other features to perform various lower-level tasks, possibly as background-type operations.

Power management functionality 412 performs one such background-type operation. More specifically, the power management functionality 412 corresponds to a collection of hardware and/or software features operating to manage the power consumed by the user device 104. The power management functionality 412 generally operates to reduce the power consumed by the device 104. The power management functionality 412 achieves this goal by selectively powering down features not actively being used (or for which there is an assumption these features are not actively being used). The power management functionality 412 achieves particularly noteworthy power savings by powering down features which make large power demands, such as one or more features associated with wireless communication.

The user device 104 may also include performance Monitoring and Testing (MT) functionality 414. The MT functionality 414 maintains a performance log 416 identifying the behavior of the device 104. The IPS 102 and/or other entities may access the performance log 416, along with other information gleaned from the communication infrastructure 106, to help diagnose anomalies in the operation of the user device 104 and the system 300 as a whole. The MT functionality 414 may also interact with testing functionality provided by the IPS 102 and/or other entities. For example, the MT functionality 414 may respond to test probes generated by the IPS 102.

The user device 104 may also include an upgrade-related functionality 418. The upgrade-related functionality 418 allows the user device 104 to receive and integrate instruction-bearing update items (such as software updates). In one case, the upgrade-related functionality 418 may automatically receive instruction-bearing items provided by the IPS 102 (and/or by other entities). An administrator at the IPS 102 may manually initiate the upgrade procedure by which an instruction-bearing update item is forwarded to the user device 104. Or an automated IPS-side routine may initiate the upgrade procedure. In any event, the user device may receive the instruction-bearing update item without the involvement of the user or with minimal involvement from the user. In this sense, the upgrade procedure may be viewed as "transparent." In another case, the upgrade-related functionality 418 may be operated by the user to manually access a source of instruction-bearing items (such as a prescribed website or the like) and download an item from this source.

To repeat, the above-enumerated list of modules is representative and is not exhaustive of the types of functions performed by the user device 104. As indicated by the label "Other Device-Side Functionality," the user device 104 may include additional functions.

The IPS 102 described above may interact with any type of user device 104. In one case, the user device 104 is a portable-type device, meaning a device designed to be readily carried from location to location. In one specific case, the user device 104 allows the user to consume the media items while holding the user device 104, e.g., in a manner which simulates the way a user might hold a physical book. A portable user device may take the form of an eBook reader device, a portable music player, a personal digital assistant, a mobile telephone, a game module, a laptop computer, and so forth, and/or any combination of these types of devices. Alternatively, or in addition, the user device 104 may correspond to a device not readily portable, such as a personal computer, set-top box associated with a television, gaming console, and so on.

Figure 5:
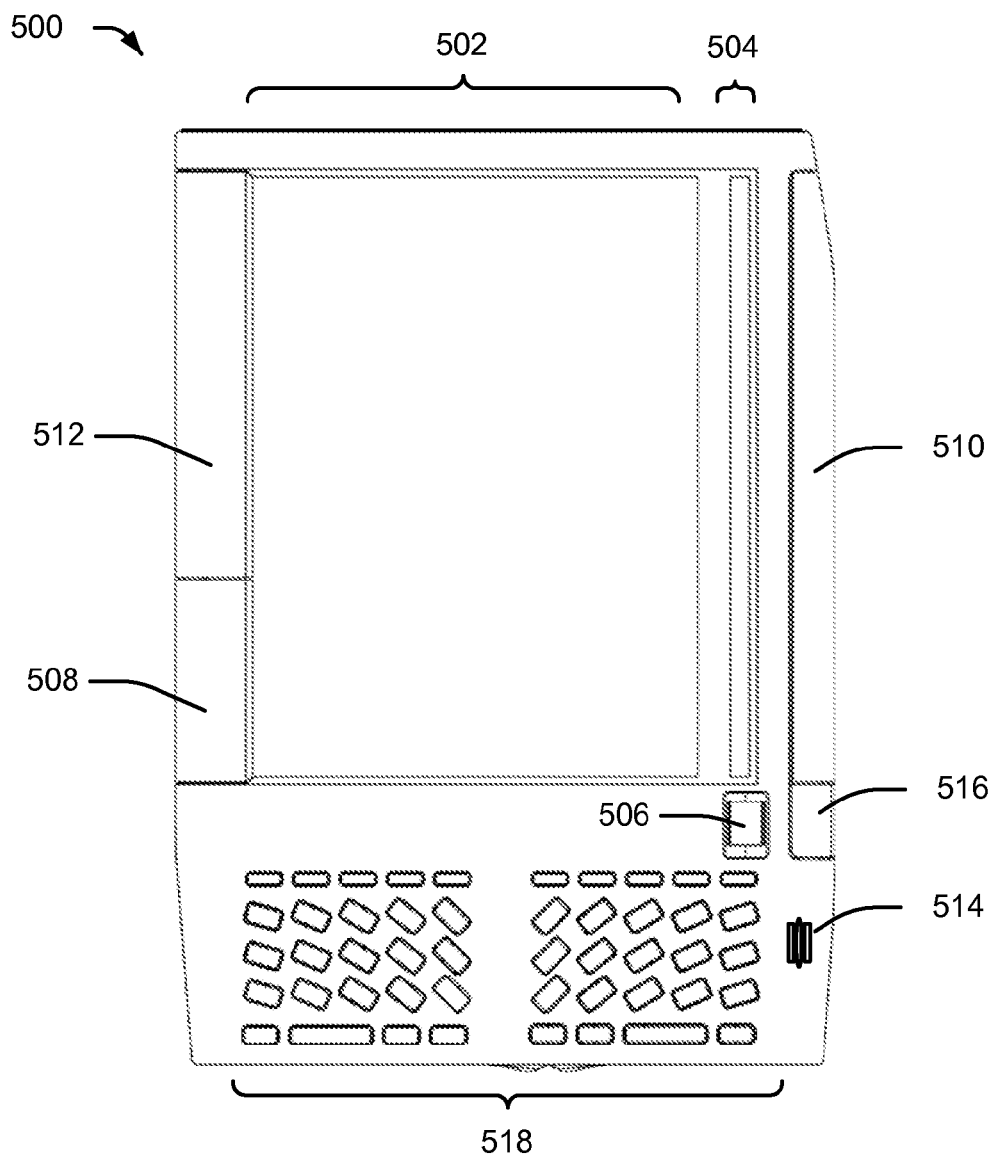
FIG. 5 shows one type of user device which may be used to interact with the IPS.

Without limitation, FIG. 5 shows one type of user device 500 which may be used to interact with the IPS 102. The user device 500 may include a wedge-shaped body designed to fit easily in the hands of a user, generally having the size of a paperback book. Other user devices may adopt different shapes and sizes.

In one representative design, the user device 500 includes two display parts: a main display part 502 and a supplemental display part 504. The main display part 502 presents various pages provided by the store interaction module 344, the reader module 340, and so on. In one case, the supplemental display part 504 is used to present a cursor. The user may position the cursor to identify laterally adjacent portions in the main display part 502. Without limitation, in one illustrative case, the main display part 502 and/or the supplemental display part 504 may be implemented using electronic paper technology, such as provided by E Ink Corporation of Cambridge, Mass. This technology presents information using a non-volatile mechanism; using this technology, the user device 500 may retain information on its display even when the device is powered off.

The user device 500 includes various input keys and mechanisms. A cursor-movement mechanism 506 allows a user to move a cursor within the supplemental display part 504. In one representative case, the cursor-movement mechanism 506 may include a cursor wheel that may be rotated to move a cursor up and down within the supplemental display part 504. The cursor-movement mechanism 506 may be configured to allow the user to make a selection by pressing down the wheel. Other types of selection mechanisms may be used, such as a touch-sensitive display, a series of vertically and/or horizontally arrayed keys along the edge(s) of the main display part 502, one or more graphical scroll bar(s) in the main display part 502, and so on.

The user device 500 also includes various page-turning buttons, such as next page buttons (508, 510) and a previous page button 512. The next page buttons (508, 510) advance the user to a next page in an item (relative to a page that is currently being displayed). The previous page 512 button advances the user to a previous page in an item (relative to a page that is currently being displayed). The user device 500 may also include a page-turning input mechanism 514 actuated by the user's thumb as it passes over the mechanism 514. This user experience simulates the manner in which a user turns a page in a physical book (e.g., by "thumbing through" a book). The user device 500 may also include a back button 516 allowing the user to advance to a previous page when using the browsing module. Although not shown, the user device 500 may include a switch for turning power on and off, a switch for enabling and disabling a wireless interface, and so on. The user device 500 may also include a keyboard 518. The keyboard 518 may include alphanumeric keys. The keys may be shaped and oriented in a manner which facilitates the user's interaction with the keys while the user holds the device 104 in the manner of a physical book. The user may use the keyboard 518 to enter search terms, annotations, URLs, and so forth. The user may also use the keyboard 518 to respond to testing content. The keyboard 518 may also include various special-function keys.

Figure 6:
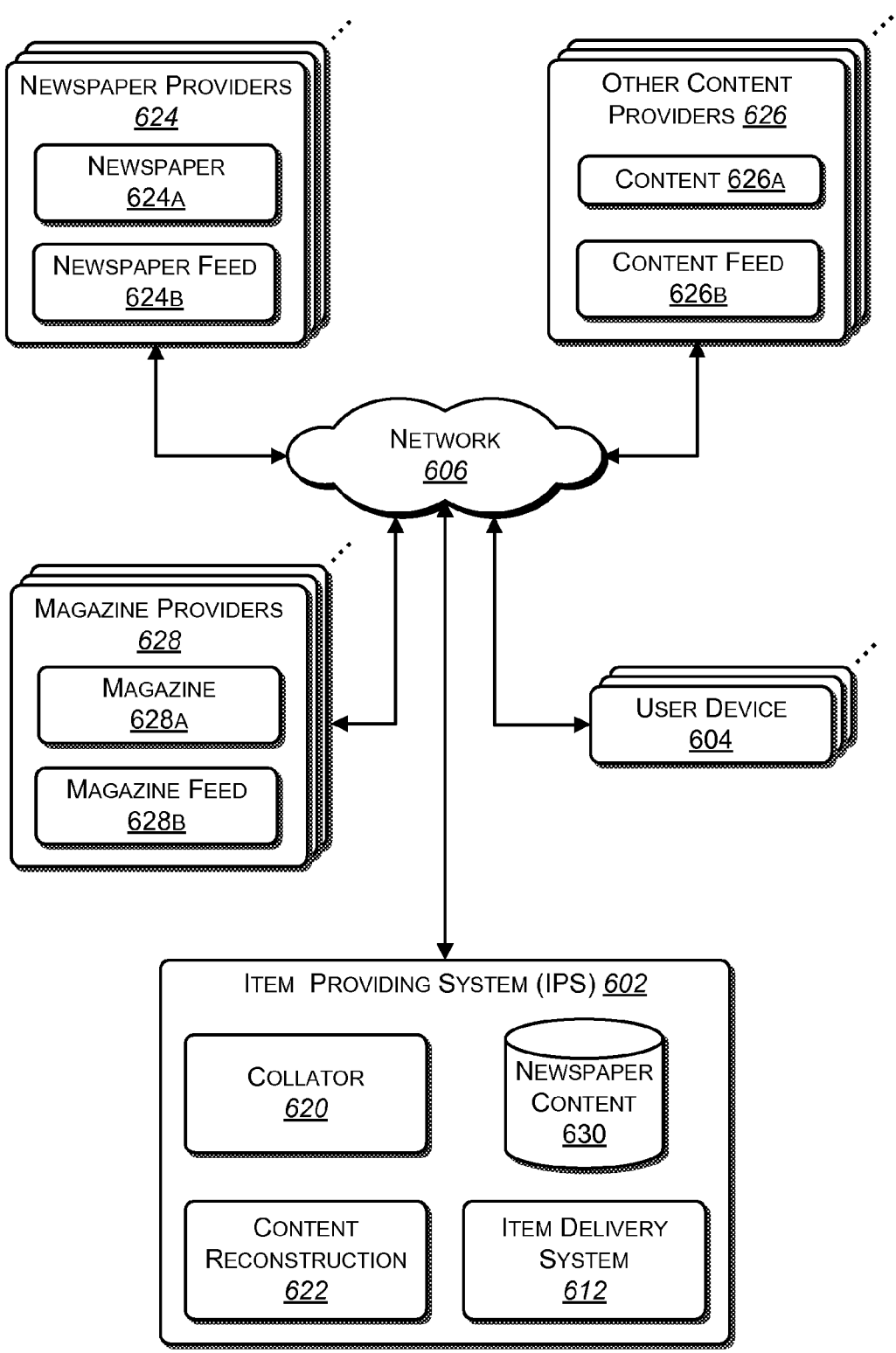
FIG. 6 is a block diagram illustrating content being provided to an IPS.

FIG. 6 is a block diagram illustrating content being provided to an Item Providing System (IPS) 602. Different kinds of digital content may be provided to the IPS 602. As described previously, the IPS 602 may in turn provide these pieces of digital content to user devices 604.

Newspaper providers 624 may provide electronic newspapers 624a or newspaper feeds 624b via a network 606 to the IPS 602. Examples of newspaper providers 624a include the New York Times, the Washington Post, the Los Angeles Times, etc. Newspaper feeds 624b may be provided in different formats using different technologies. For example, newspaper feeds 624b may be provided by RSS (Really Simple Syndication) feeds. Electronic newspapers 624a may be provided in various formats. For example, electronic newspapers 624a may be provided in PDF format, text format, Microsoft Word format, .MOBI format, PRC format, image formats such as TIFF, JPEG, GIF, etc.

Depending on the number of publications of the newspaper 624a, the IPS 602 may obtain the newspapers 624a via the network 606 at different frequencies. For example, if a newspaper 624a were a daily newspaper, the IPS 602 may obtain a copy of this newspaper 624a once per day. If the newspaper 624a had multiple editions per day, the IPS 602 may obtain multiple copies of the newspaper 624a per day as needed. The newspapers 624a may ultimately be provided to user devices 604 that have requested to subscribe to one or more newspapers 624a through the IPS 602.

Magazine providers 628 may provide electronic magazines 628a and/or magazine feeds 628b to the IPS 602. Similar to the newspaper providers 624, the magazine providers 628 may provide digital content as often as the magazine 628a is published. Some examples of magazines 628a include Newsweek, Time, People, etc. The IPS 602 may send or transmit the magazines 628a to user devices 604 who have subscribed or who have otherwise requested the magazines 628a.

Other content providers 626 may also provide content 626a and/or content feeds 626b to the IPS 602 via the network 606. Other content providers 626 may include providers of audio, video, a news wire service, etc. The other content providers 626 referenced in FIG. 6 are intended to include all other kinds of providers that may not be included in the newspaper providers 624 or the magazine providers 628.

The IPS 602 may obtain different kinds of items or digital content and perform various operations and/or functions on this digital content that will then be provided to user devices 604. As discussed previously, the item delivery system 612 may be used to communicate with user devices 604. The IPS 602 may include a database of newspaper content 630. The IPS 602 may also include many other kinds of databases (not shown in FIG. 6) to include the different kinds of digital content that it 602 may provide to user devices 604.

The IPS 602 may also include a collator 620 that operates to organize and format digital content, as will be discussed hereinafter. A content reconstruction tool 622 may be used to reconstruct digital content that, for whatever reason, may not be complete. The content reconstruction tool 622 will be discussed below. After discussion of the content reconstruction tool 622, a description of the collator 620 follows.

Figure 7:
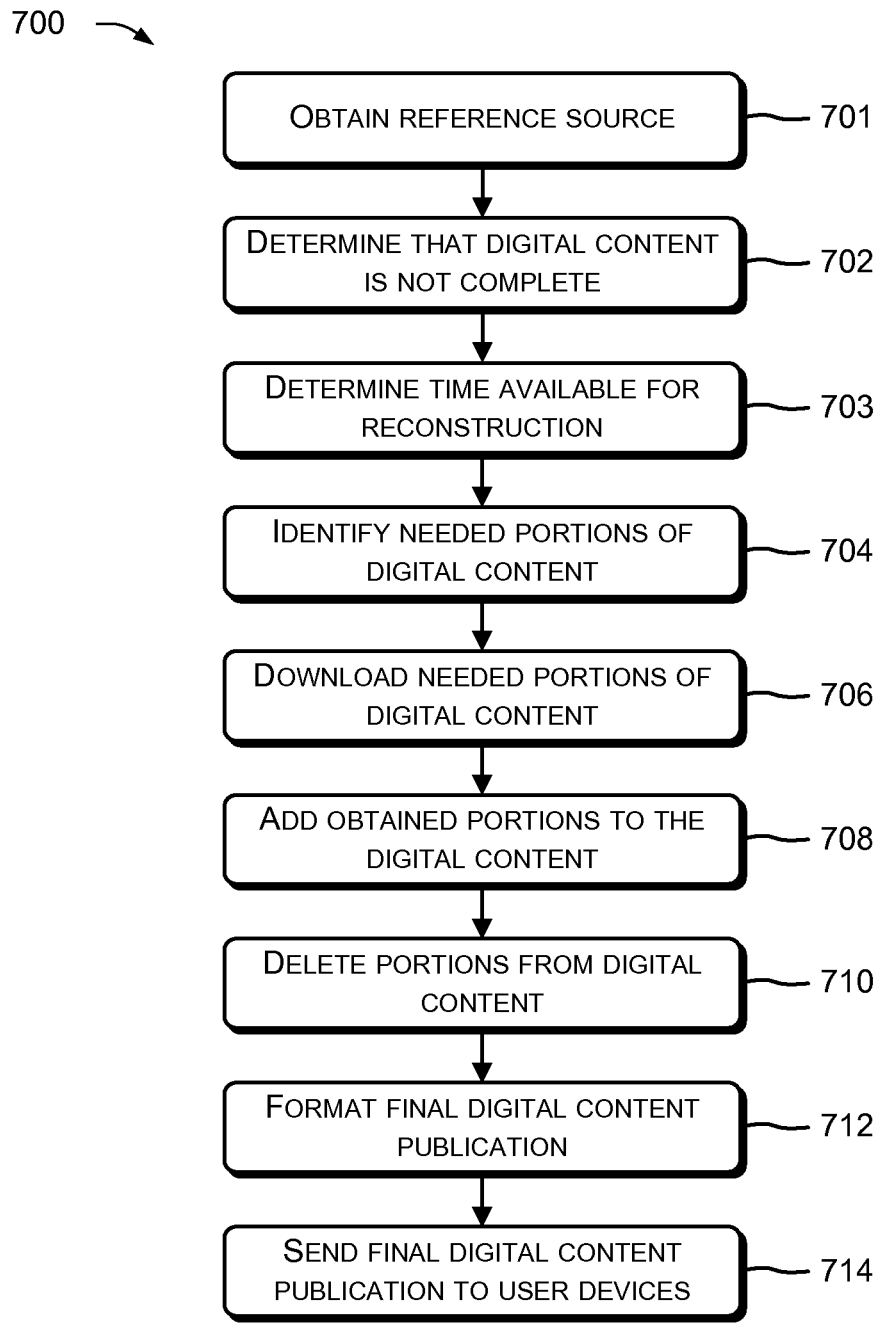
FIG. 7 is one configuration of a method of operation for a content reconstruction tool.

FIG. 7 is one configuration of a method 700 of operation for a content reconstruction tool 622. A reference source may be obtained 701. A content reconstruction tool 622 may determine 702 that digital content is not complete. The reference source obtained 701 may be used in determining 702 whether digital content is complete by comparing the current digital content with the reference source to identify any differences. Thus, the reference source may be used as a model for what the digital content should look like. The time available to perform the content reconstruction may be determined 703. For example, if an electronic newspaper is expected to be available and/or delivered by a certain time every morning, knowing the time available to perform content reconstruction would be important in trying to meet the delivery deadline.

The content reconstruction tool 622 may then identify 704 the needed portions of the digital content. Examples of digital content that are not complete include, but are not limited to, an entire electronic newspaper missing, one or more articles missing, information in the articles missing, etc. An example of an entire work missing may be when a newspaper feed 624b is down. When a newspaper feed 624b is down, the IPS 102 may be unable to acquire any portion of that edition of the newspaper 624a. When the entire work is missing, the content reconstruction tool 622 may obtain the newspaper 624a from whatever source is available. In other circumstances one or more single articles may be missing. For example, an article in the business section may be missing but the rest of the business section may still be intact. With this example, the content reconstruction tool 622 may only need to acquire the one article that is missing. Another example of portions of digital content that may be missing includes when one or more pieces of information from an article are missing. Examples of this include when a title is missing, when a subtitle is missing, when the author name is missing, etc. Further examples of portions or parts of articles that may be missing will be discussed in relation to FIG. 8 below.

After the content reconstruction tool 622 has identified 704 the needed portions of digital content, it may download 706 the needed portions of digital content. The content reconstruction tool 622 may obtain the needed portions of digital content in various ways. For example, the content reconstruction tool 622 may obtain the needed portions of digital content from a website of the provider. Once the needed portions of the digital content are downloaded 706, the content reconstruction tool 622 may then add 708 these portions to the digital content.

In addition, the content reconstruction tool 622 may also delete 710 certain portions from the digital content. The content reconstruction tool 622 may delete 710 portions of the digital content when certain portions of the digital content are undesirable to be sent to the user device 604. For example, if an IPS desired to provide copies of newspapers 624a that matched the hard copy or written version of the newspaper, the content reconstruction tool 622 may delete 710 portions of the digital content that are not found in the hard copy or written version of the newspaper.

After the content reconstruction tool 622 has added 708 and/or deleted 710 portions to and/or from the digital content, it may format 712 a final digital content publication. Depending on the user device, the content reconstruction tool may format 712 the final publication in different ways. For example, the final digital content publication may be saved and/or formatted 712 into PDF files, MOBI files, PRC files, text files, image files, etc. After the final digital content publication is formatted 712 and ready, the IPS may send 714 the final digital content publication to user devices. Thus, the content reconstruction tool 622 may "fix" a piece of digital content for a user while the user may be unaware that a problem occurred with the digital content such as a newspaper 624a or newspaper feed 624b. For example, if the New York Times newspaper feed is down, the content reconstruction tool 622 may operate to provide a final publication version of that edition of the New York Times to user devices despite the fact that the newspaper feed for that edition was down.

Regarding the content reconstruction tool 622, the steps illustrated in FIG. 7, and any other changes that may be made to digital content, it should be noted that such changes may depend on the permission(s) granted by the publisher of the digital content. For example, if a publisher only gave permission or rights that allowed portions to be deleted but not added to the digital content, the adding 708 step may be skipped. Similarly, if a publisher gave no permission or rights to delete, the deleting 710 step may be skipped. Generally speaking, the actions performed on a piece of digital content should be governed by the rights or permissions that have been granted.

Figure 8:
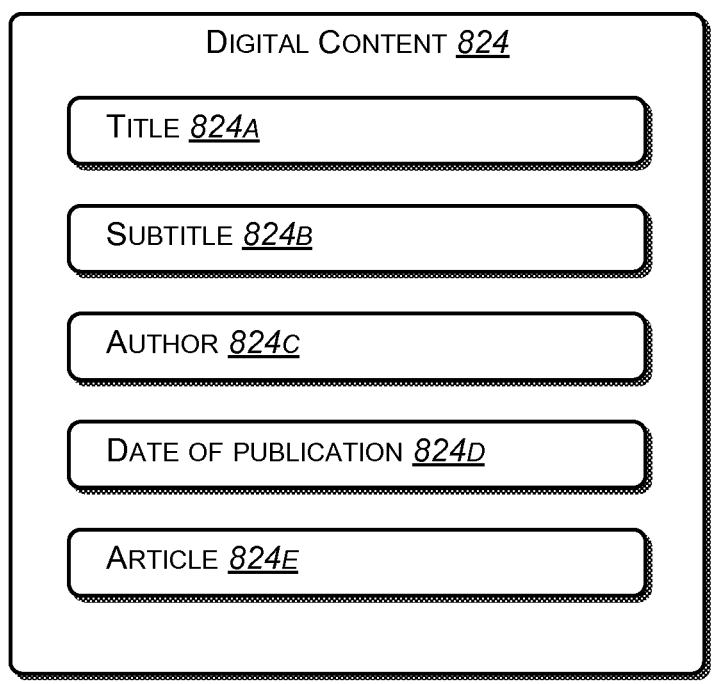
FIG. 8 is a block diagram of one configuration of digital content that may be processed by the content reconstruction tool and/or a collator.

FIG. 8 is a block diagram of one configuration of digital content 824 that may be processed by the content reconstruction tool 622 and/or the collator 620. Digital content 824 may include various parts and/or fields. Digital content 824 may include a title 824a. If the piece of digital content were an article, the title 824a may be the title of the article. In some situations, digital content 824 may include a subtitle 824b. An author 824c may also be included with digital content 824. In some situations, a date of publication 824d may be provided with the digital content 824. The article 824e portion of the digital content 824 refers to the main component of the digital content 824 (e.g., the article itself for a story).

If the digital content 824 were a larger work, the digital content 824 may include multiple title fields 824a, multiple subtitle fields 824b, multiple author fields 824c, and multiple article fields 824e. For example, a newspaper 624a may include a great number of articles 824e. Each article 824e within the newspaper 624a may include any or all of the fields or portions of data shown in FIG. 8. Additional fields (not shown) may also be used in different configurations of digital content 824.

Figure 9:
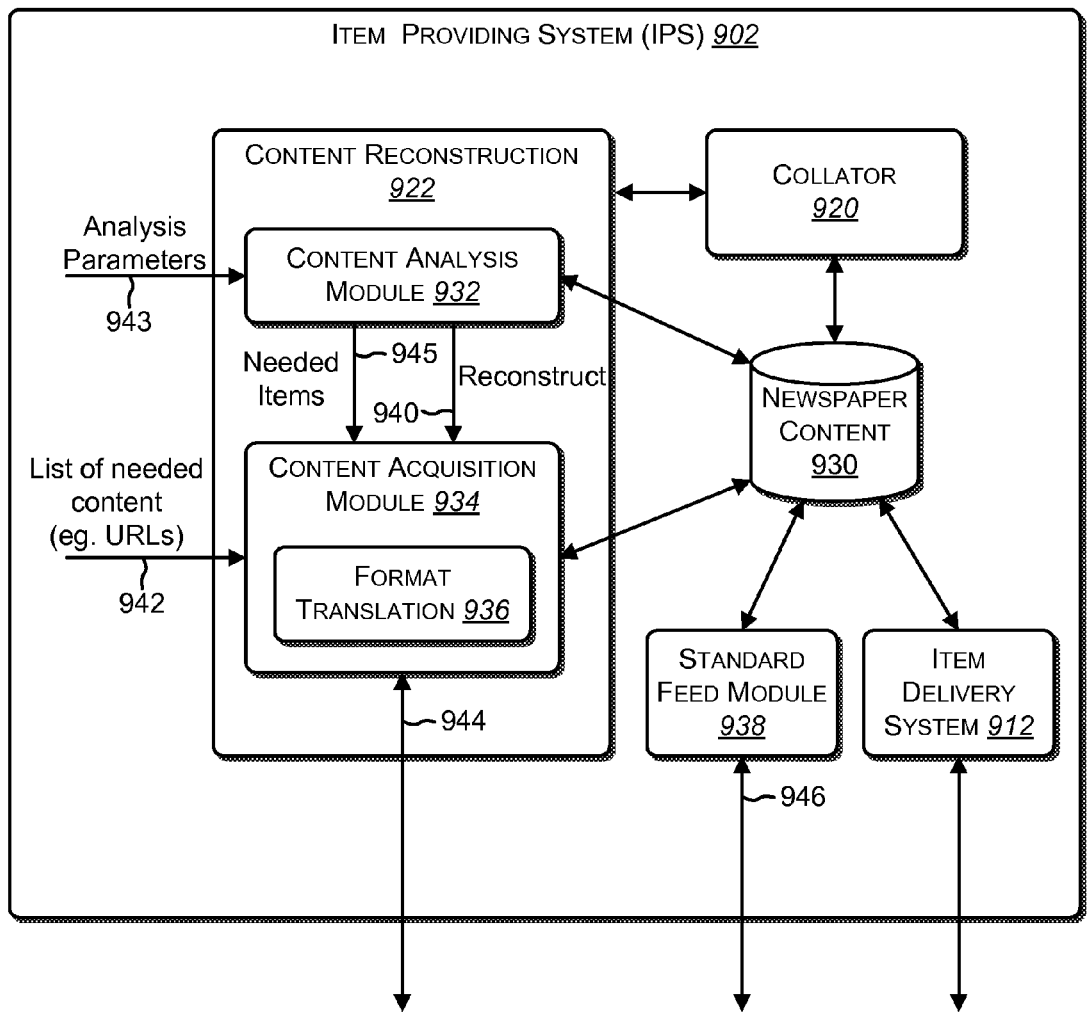
FIG. 9 is a block diagram illustrating one configuration of an IPS and a content reconstruction tool.

FIG. 9 is a block diagram illustrating one configuration of an item providing system (IPS) 902 and a content reconstruction tool 922. The IPS 902 may include other components as described above, in addition to the components shown in this FIG. 9. The content reconstruction tool 922 and other components illustrated may also be part of another system separate and distinct from the IPS 902. Thus, the content reconstruction tool 922 and other components may be implemented on a content reconstruction system (not shown), for example, that may be in electronic communication with the IPS 902.

A standard feed module 938 may obtain 946 newspaper feeds 624b and/or electronic newspapers 624a from various sources and store them in the newspaper content database

930. The standard feed module 938 may operate on a regular basis to obtain 946 various kinds of digital content 824 as required for the IPS 902. Although the standard feed module 938 specifically refers to a feed, the standard feed module 938 may also obtain digital content 824 where the mechanism is not a standard feed. The item delivery system 912 is used to deliver and/or otherwise communicate with the user device 104 as described previously in FIG. 3. The newspaper content database 930 may be one or more databases. The newspaper database 930 may store a plurality of newspapers 624*a*.

The content reconstruction tool 922 may include a content analysis module 932. The content analysis module 932 may operate to analyze newspapers 624*a* within the newspaper content database 930 and determine when the newspaper 624*a* is incomplete or otherwise needs attention. The content analysis module 932 may determine that a newspaper 624*a* or other piece of digital content 824 is incomplete in various ways. For example, the content analysis module 932 may analyze a particular newspaper 624*a* for missing data. The content analysis module 932 may be fully automated, or it may use manual input from an operator (a person). Additionally, the content analysis module 932 may be implemented using a combination of automated components with manual input from an operator. Missing data may include entire articles 824*e* that are missing, titles 824*a* that are missing, author names 824*c* that are missing, etc. In one configuration, the standard feed module 938 may operate as the content analysis module 932 to determine when a newspaper 624*a* is incomplete. For example, if the standard feed module 938 determines that a feed is unavailable on a particular day, it 938 may alert the content reconstruction tool 922 that the newspaper 624*a* needs to be reconstructed. In another configuration, an operator may determine that a feed is unavailable on a particular day, and he or she may use the content reconstruction tool 922 as needed.

The content analysis module 932 may analyze the pieces of digital content 824 from the newspaper content database 930 in order to determine when an item is not complete. By way of example, the content analysis module 932 may view the digital content 824 for sudden breaks in the content, for unexpected symbols and/or codes, etc. Different newspaper providers 624 may include different kinds of data and/or formatting signals that may be used by the content analysis module 932 in determining whether a particular piece of digital content 824 is complete.

In another configuration, an operator may manually analyze the pieces of digital content 824 from the newspaper content database 930 in order to determine when an item is not complete. By way of example, the operator may view the digital content 824 and compare it with a reference source, or the operator may look for any anomalies in the digital content 824.

Analysis parameters 943 may be fed into the content analysis module 932 to be used in analyzing the digital content 824. Different kinds of analysis parameters 943 may be used. One example of analysis parameters 943 includes a listing of article names that should be included in a particular piece of digital content 824. The content analysis module 932 may use this list of titles and compare this list with the titles found in the piece of digital content 824 in the newspaper content database 930. If the list of titles does not match the list of article titles from the content in the newspaper content database 930, the content analysis module 932 may determine that this piece of digital content 824 is not complete. It is also possible that manual input may be used as analysis parameters 943 to the content analysis module 932 in order to assist in determining whether a piece of digital content 824 is complete or incomplete. In addition, an operator may manually determine whether a piece of digital content 824 is complete or incomplete.

When the content analysis module 932 determines that a piece of digital content 824, such as a newspaper 624*a*, is incomplete, it may provide a reconstruct command 940 or instruction to a content acquisition module 934. The reconstruct command 940 or instruction may be provided by the content analysis module 932, by the content reconstruction tool 922 generally, and/or by the standard feed module 938. The reconstruction that is performed by the content reconstruction tool 922 may address the issue that caused a piece of digital content 824 to be deemed incomplete. One reconstruction job may involve downloading an article that was missing or corrupt. Another reconstruction job may involve obtaining an author field 824*c* and replacing that field in the newspaper content database 930. Generally, after reconstruction has occurred, the digital content 824 should be deemed complete, rather than incomplete.

In one implementation, reconstruction may be performed manually by an operator. In such an implementation, an operator may manually download an article that was missing or corrupt, manually obtain an author field 824*c* and replace that field in the newspaper content database 930, etc.

The content acquisition module 934 operates to acquire needed portions 945 of digital content or entire works of digital content 824, format the digital content 824 as needed and store the newly acquired content into the newspaper content database 930. When a reconstruct command 940 or instruction is given to the content acquisition module 934, the content acquisition module 934 may use a list of needed content 942 to obtain the needed items 945. For example, a URL may be used to identify a particular piece of digital content 824 that is needed. If one article were missing from a newspaper 624*a*, for example, a URL pointing to that article on the online edition of that newspaper 624*a* may be used by the content acquisition module 934 in order to download this content directly from the newspaper's website. The list of needed content 942 that is to be provided to the content acquisition module 934 may be provided by an automated process or it may be provided by manual input by a user.

The content analysis module 932 may provide needed items 945 identifying the list of needed content 942 to be acquired by the content acquisition module 934. For example, if a newspaper 624*a* analyzed by the content analysis module 932 included a table of contents, the content analysis module 932 may determine that the newspaper 624*a* should be reconstructed because an article listed in the table of contents was not found in the electronic version of the newspaper 624*a* in the newspaper content database 930. When the content analysis module 932 identifies a missing article, it may provide the needed item(s) 945 to the content acquisition module 934 along with the reconstruct command 940 or instruction. Using the list of needed content 942, 945 either provided by the content analysis module 932, provided by another automated process or provided by manual input, the content acquisition module 934 obtains 944 the needed content via a computer network and downloads or otherwise obtains 944 this content to the IPS 902.

The content acquisition module 934 may provide format translation 936 on the acquired content. For example, the content acquisition module 934 may obtain HTML or XML formatted information from the Internet when obtaining needed items 945. However, it may be that the format for the item in the newspaper content database 930 is a different format. In this situation, the content acquisition module 934 may convert the format from the original format obtained via the network to the needed format of the newspaper content database 930. By way of example, if an article were obtained in HTML format, it may be converted to MOBI format before being stored in the newspaper content database 930. If content were to be provided to user devices 104 in PDF format, the content acquisition module 934 may convert from XML, for example, into a PDF file. The content acquisition module 934 may provide various kinds of format translations 936 before saving to the newspaper content database 930.

After the content reconstruction tool 922 has obtained 944 and reconstructed one or more pieces of digital content, it may store them in the newspaper content database 930. A collator 920 may be used to organize and/or reformat one or more pieces of digital content 824 as needed. The collator 920 will be further described in relation to FIG. 10 below.

When the final publication version of the digital content 824 is ready, it may be provided by the IPS 902 to user devices. The item delivery system 912, as described herein, may be used to provide the final digital content publication to user devices 104. Thus, the item delivery system 912 may provide final digital content publications as originally obtained via the standard feed module 938 or it may provide final digital content publication versions that have been generated by the content reconstruction module 922.

Figure 10:
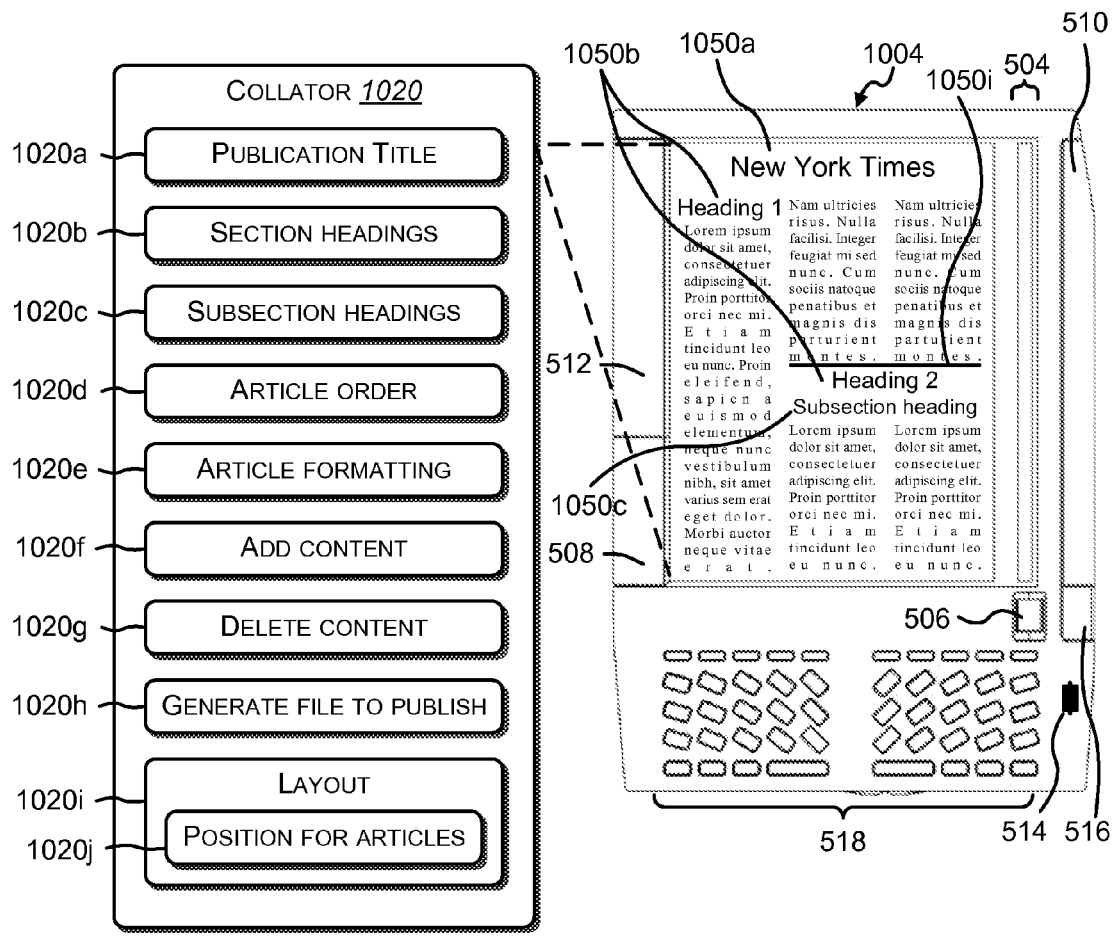
FIG. 10 is a block diagram illustrating a collator and an eBook reader being used to view a final piece of digital content.

FIG. 10 is a block diagram illustrating a collator 1020 and an eBook reader 1004 being used to view a final piece of digital content 824. The collator 1020 may be used to reorganize, rearrange and/or reformat a piece of digital content 824 for various reasons. For example, it may be desirable to provide an online newspaper 624a edition that substantially matches the hard copy version of the newspaper. In this situation, the collator 1020 may be used to rearrange and/or reformat the electronic version of the newspaper 624a so that it matches the hard copy version of the newspaper. The collator 1020 may provide a number of functions in order to provide such an edition.

The collator 1020 may provide the ability to change the publication title 1020a. The collator 1020 may also provide that section headings 1020b and subsection headings 1020c may be changed and/or reformatted. The order of articles 1020d may also be changed and otherwise manipulated. In addition, the formatting of the articles 1020e may be changed. As referred to earlier, pieces of digital content may be added 1020f and/or deleted 1020g from the electronic version of the digital content 824. If an article needed to be added to the digital content 824, an add content 1020f mechanism in the collator 1020 may be used to add this content to the electronic version of the digital content 824. If a particular article needed to be deleted from the online edition, the collator 1020 may be used to delete 1020g this content from the online version.

The collator 1020 may also provide layout 1020i functionality that enables a user and/or a system to change the layout of the electronic version of the piece of digital content. The layout refers to the organization and appearance of the digital content. When working with the layout 1020i of an electronic newspaper 624a, positions 1020j for articles may be saved and/or configured in order to affect a layout 1020i of the online edition of the newspaper 624a. When the final publication edition of the digital content 824 is ready, the collator 1020 may generate 1020h a file to publish. This final version of the digital content 824 may be in a format that is compatible with the newspaper content database 630. If the collator 1020 has the ability to generate 1020h a file in a final publication format, the collator 1020 may use different file formats when preparing and laying out an online edition of a piece of digital content 824. In this situation, versions obtained directly from websites or server systems on the Internet may be used by the collator 1020 in reorganizing the piece of digital content 824. For example, the collator 1020 may use and/or work with HTML, XML, text files, JPEG files, GIF files, etc.

FIG. 10 also illustrates an eBook reader 1004 viewing a piece of digital content 824. The piece of digital content 824 shown in the eBook reader 1004 of FIG. 10 is the New York Times. The New York Times shown in the eBook reader 1004 is an electronic version of a newspaper 624a. As shown, the title of the publication 1050a is shown on the eBook reader 1004 as well as section headings 1050b, subsection headings 1050c, and layout elements 1050i.

Tables 1 and 2, below, illustrate an electronic newspaper front page and table of contents before and after the use of the collator 1020. The changes made by the collator 1020 as illustrated by Tables 1 and 2 are only examples of possible changes that may be made by the collator 1020.

The electronic newspaper of Table 1 includes the name of the newspaper (The Daily News), and several headings (News, Other News, Editorial, Sports and Local News). The titles of the articles (T1-T25) are listed. In one implementation the titles (T1-T25) may be links that, when clicked on, take the user to the body of the article within the electronic newspaper.

TABLE 1

Electronic Newspaper before Processing by Collator
THE DAILY NEWS

NEWS

Title of Article T1
Lorem ipsum dolor sit
amet, consectetuer adipiscing
elit. Donec nec elit a nisi
iaculis auctor. . .
Title of Article T2
Lorem ipsum dolor sit amet, consectetuer
adipiscing elit. Donec nec elit a nisi iaculis
auctor. . .
Title of Article T3
Lorem ipsum dolor sit amet,
consectetuer adipiscing elit.
Donec nec elit a nisi iaculis
auctor. . .
Title of Article T4
Lorem ipsum dolor sit amet,
consectetuer adipiscing elit.
Donec nec elit a nisi iaculis
auctor. . .

OTHER NEWS

Title of Article T5
Title of Article T6
Title of Article T7
Title of Article T8

EDITORIAL

Title of Article T9
Title of Article T10
Title of Article T11
Title of Article T12
Title of Article T13
Title of Article T14

SPORTS

Title of Article T15
Title of Article T16
Title of Article T17
Title of Article T18

LOCAL NEWS

Title of Article T19
Title of Article T20
Title of Article T21

TABLE 1-continued

Electronic Newspaper before Processing by Collator
THE DAILY NEWS

Title of Article T22
Title of Article T23
Title of Article T24
Title of Article T25

Table 2, below, illustrates the electronic newspaper after the use of the collator 1020. In this example, several changes were made by the collator 1020. The title of articles for T2 and T4 were removed, and the title of articles for T26 and T27 were added. Of course, the articles associated with the titles of articles for T2 and T4 would have been removed from the newspaper, and the articles associated with titles of articles T26 and T27 would have been added to the newspaper. This will be true for other articles that have been added and/or removed from the newspaper.

Two additional articles were added to the Other News section as indicated by the title of articles for T28 and T29. A new section for International News was added after the Other News section. The International Section has several articles in it (T30-T34). The Sports section had two articles added to it (T35 and T36). The articles in the Sports section were also rearranged so that articles T17 and T18 were listed before the articles for T15 and T16.

Another change made by the collator 1020 was the removal of the Local News section. The Editorial section was moved so that it came after the Sports section. The articles in the Editorial section T9-T14 were left as they were originally arranged within the Editorial section.

TABLE 2

Electronic Newspaper after Processing by Collator
THE DAILY NEWS

NEWS

Title of Article T1
Lorem ipsum dolor sit
amet, consectetuer
adipiscing elit. Donec nec
elit a nisi iaculis auctor. . .
Title of Article T26
Lorem ipsum dolor sit
amet, consectetuer
adipiscing elit. Donec nec
elit a nisi iaculis auctor. . .
Title of Article T3
Lorem ipsum dolor sit
amet, consectetuer
adipiscing elit. Donec nec
elit a nisi iaculis auctor. . .
Title of Article T27
Lorem ipsum dolor sit
amet, consectetuer
adipiscing elit. Donec nec
elit a nisi iaculis auctor. . .
OTHER NEWS Title of Article T5
Title of Article T6
Title of Article T7
Title of Article T8
Title of Article T28
Title of Article T29
INTERNATIONAL
NEWS Title of Article T30
Title of Article T31
Title of Article T32

TABLE 2-continued

Electronic Newspaper after Processing by Collator
THE DAILY NEWS

Title of Article T33
Title of Article T34
SPORTS

Title of Article T17
Title of Article T18
Title of Article T15
Title of Article T16
Title of Article T35
Title of Article T36
EDITORIAL Title of Article T9
Title of Article T10
Title of Article T11
Title of Article T12
Title of Article T33
Title of Article T13
Title of Article T14

Figure 11:
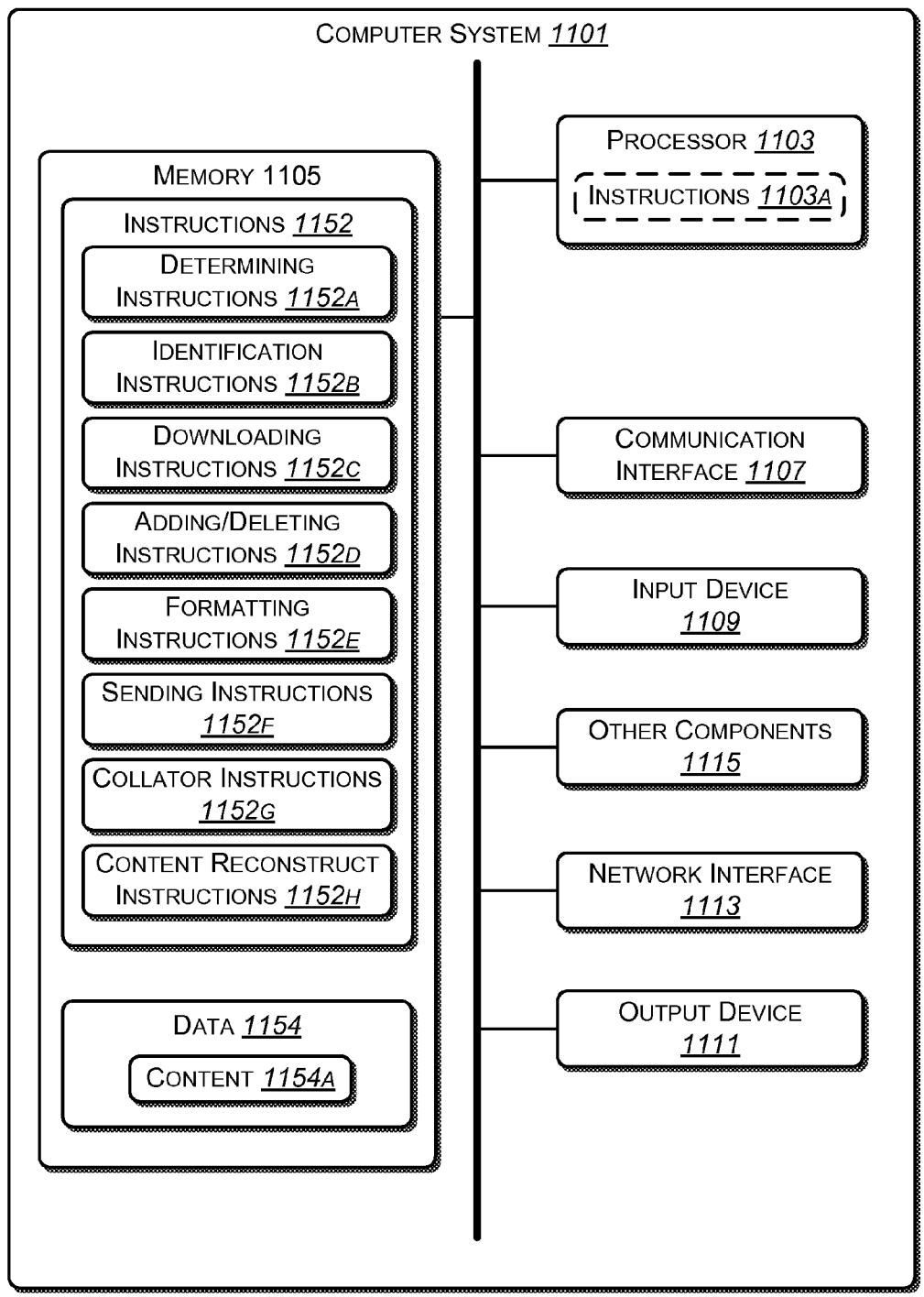
FIG. 11 illustrates various components that may be utilized in a computer system.

FIG. 11 illustrates various components that may be utilized in a computer system 1101 to implement one or more of the embodiments described herein. For example, a computer system 1101 may be used to implement the item providing system, the content reconstruction tool, the collator, or any combination thereof. The illustrated components may be located within the same physical structure or in separate housings or structures. Thus, the term computer or computer system 1001 is used to mean one or more broadly defined computing devices unless it is expressly stated otherwise. Computing devices include the broad range of digital computers including microcontrollers, hand-held computers, personal computers, servers, mainframes, supercomputers, minicomputers, workstations, and any variation or related device thereof.

The computer system 1101 is shown with a processor 1103 and memory 1105. The processor 1103 may control the operation of the computer system 1101 and may be embodied as a microprocessor, a microcontroller, a digital signal processor (DSP) or other device known in the art. The processor 1103 typically performs logical and arithmetic operations based on program instructions stored within the memory 1105, defined below. The instructions 1152 in the memory 1105 may be executable to implement the methods described herein.

The computer system 1101 may also include one or more communication interfaces 1107 and/or network interfaces 1113 for communicating with other electronic devices. The communication interface(s) 1107 and the network interface (s) 1113 may be based on wired communication technology, wireless communication technology, or both.

The computer system 1101 may also include one or more input devices 1109 and one or more output devices 1111. The input devices 1109 and output devices 1111 may facilitate user input. Other components 1115 may also be provided as part of the computer system 1101.

Data 1154 and instructions 1152 may be stored in the memory 1105. The processor 1103 may load and execute instructions 1103a from the instructions 1152 in memory to implement various functions. Executing the instructions 1152 may involve the use of the data 1154 (e.g., content 1154a) that is stored in the memory 1105.

The instructions 1152 in the memory 1105 may include instructions 1105 for determining 1152a whether digital content is complete, as described above. The instructions 1152 in the memory 1105 may also include instructions 1152 identifying 1152b needed portions of digital content, as described above. Downloading 1152*c* instructions for obtaining needed digital content are also included. The instructions 1152 in the memory 1105 may also include instructions for adding 1152*d* and for deleting 1152*d* portions to/from digital content, as described above. Program instructions 1152 for formatting 1152*e* may also be stored in the memory 1105. Instructions 1152 to send 1152*f* the final digital content publication to a user device are also stored in the memory 1105. The instructions 1152 in the memory 1105 may also include collator instructions 1152*g* for implementing the collator, as described above. The instructions 1152 in the memory 1105 may also include content reconstruction instructions 1152*h* for implementing the content reconstruction tool generally, as described above.

Data 1154 may also be stored in the memory 1105. The data 1154 may generally include items or digital content or other data, such as electronic newspapers, the electronic newspaper database, eBooks, parameters, lists of needed content, etc., as described above.

FIG. 11 illustrates only one possible configuration of a computer system 1101. Various other architectures and components may be utilized.

Figure 12:
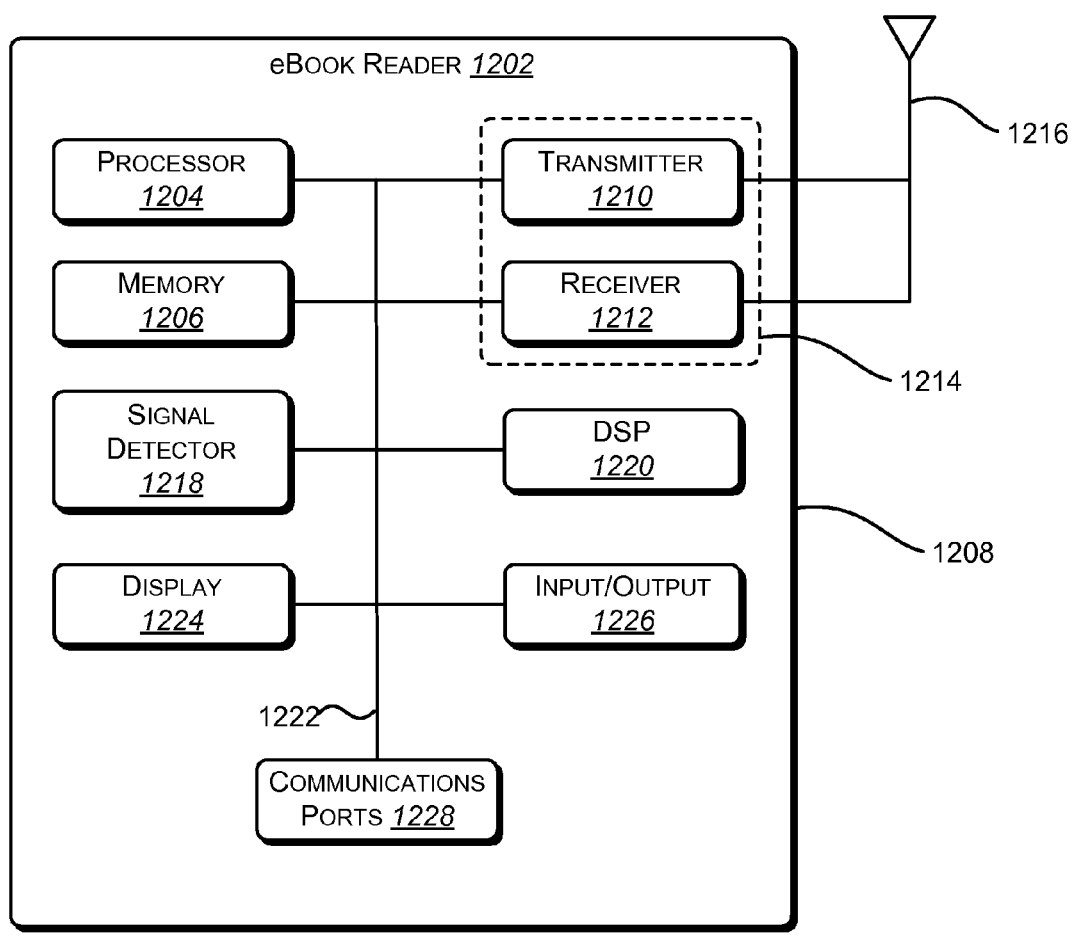
FIG. 12 illustrates various components that may be utilized in an eBook reader.

Reference is now made to FIG. 12. FIG. 12 illustrates an example of a user device 1202 that is configured to view digital content. The user device 1202 is an example of an electronic device that may be configured to implement the techniques described herein associated with a user device.

The user device 1202 may be an eBook reader 1202, i.e., a device that may be used to read eBooks. If the user device 1202 is an eBook reader, the eBook reader 1202 may be specifically designed for the purpose of reading eBooks. Alternatively, the eBook reader 1202 may be intended for other purposes as well. The user device 1202 may be configured similarly to the user device 500 that is shown in FIG. 5.

The user device 1202 includes a processor 1204. The processor 1204 may be a general purpose single- or multi-chip microprocessor (e.g., an ARM), a special purpose microprocessor (e.g., a digital signal processor (DSP)), a microcontroller, a programmable gate array, etc. The processor 1204 may be referred to as a central processing unit (CPU).

The user device 1202 also includes memory 1206. The memory 1206 may be any electronic component capable of storing electronic information. The memory 1206 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

The device 1202 may also include a housing 1208 that may include a transmitter 1210 to allow transmission of data from the user device 1202 to a remote location. The user device 1202 may also include a receiver 1212 to allow reception of data at the user device 1202 from a remote location. The transmitter 1210 and receiver 1212 may be collectively referred to as a transceiver 1214. An antenna 1216 may be electrically coupled to the transceiver 1214.

The user device 1202 may also include one or more communication ports 1228 for communicating with other electronic devices. Communication with other electronic devices may occur directly and/or via a computer network. Some examples of communication ports 1228 include Ethernet ports, Universal Serial Bus (USB) ports, parallel ports, serial ports, etc.

Additionally, input/output components 1226 may be included with the device 1202 for various input and output to and from the device 1202. Examples of different kinds of input components include a keyboard, keypad, mouse, microphone, remote control device, buttons, joystick, trackball, touchpad, light pen, etc. Examples of different kinds of output components include a speaker, printer, etc. One specific type of output component is a display 1224.

The display 1224 may be an electronic paper display, which is a display that is capable of holding text and images indefinitely without drawing electricity, while allowing the text and images to be changed later. There are several different technologies that may be used to create an electronic paper display, including electrophoretic display technology, bistable liquid crystal display (LCD) technology, cholesteric LCD display technology, etc. Alternatively, the display 1026 may utilize another image projection technology, such as liquid crystal display (LCD), gas plasma, light-emitting diode (LED), etc. One or more other output devices 1226, such as audio speakers, may also be included in the user device 1202.

FIG. 12 illustrates just one possible example of a user device 1202. There are a number of modifications that may be made to the user device 1202 in accordance with the present disclosure. For example, although just a single processor 1204 is shown in the user device 1202 of FIG. 12, alternatively a combination of processors 1204 (e.g., an ARM and DSP) could be used. As another example, the user device 1202 may include multiple transmitters 1210, multiple receivers 1212, multiple transceivers 1214 and/or multiple antenna 1216. Other modifications are also possible in accordance with the present disclosure. Thus, the example shown in FIG. 12 should not be construed as limiting the scope of the present disclosure.

The device 1202 may also include a signal detector 1218 that may be used to detect and quantify the level of signals received by the transceiver 1214. The signal detector 1218 may detect such signals as total energy, pilot energy per pseudo noise (PN) chips, power spectral density, and other signals. The wireless device 1202 may also include a digital signal processor (DSP) 1220 for use in processing signals.

The various components of the device 1202 may be coupled together by a bus system 1222 which may include a power bus, a control signal bus, and a status signal bus in addition to a data bus. However, for the sake of clarity, the various busses are illustrated in FIG. 12 as the bus system 1222.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

As used herein, the terms "code" and "instructions" should be interpreted broadly to include any type of computer-readable statement(s). For example, the terms "code" and "instructions" may refer to one or more programs, routines, sub-routines, functions, procedures, etc.

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® Blu-ray disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for performing content reconstruction on digital content, the method comprising:
   obtaining a reference source that provides a version of the digital content;
   accessing stored digital content, wherein the stored digital content is a first edition of an electronic newspaper distributed at a first time and the version of the digital content provided by the reference source is a second edition of the electronic newspaper distributed at a second time after the first time;
   comparing the stored digital content to the reference source to identify differences between the stored digital content and the reference source, the identified differences indicating additional content provided by the reference source that is missing from the stored digital content;
   determining, by one or more processors, that the stored digital content is to be modified based at least in part on one or more of the identified differences that indicate the additional content;
   obtaining at least a portion of the additional content using a computer network;
   adding the at least a portion of the additional content to the stored digital content to create updated digital content;
   rearranging the updated digital content; and
   sending the updated digital content to a user device.

2. The method of claim 1, further comprising managing subscriptions to the electronic newspaper for a plurality of user devices.

3. The method of claim 1, wherein determining that the stored digital content is to be modified comprises determining that the stored digital content is not complete.

4. The method of claim 1, wherein determining that the stored digital content is to be modified comprises determining that a layout of the stored digital content needs to be changed.

5. The method of claim 1, further comprising determining a time available to perform content reconstruction on the stored digital content using the at least a portion of the additional content, wherein the updated digital content is sent to the user device within the time available.

6. The method of claim 1, wherein the additional content is one or more articles added to the electronic newspaper in between the first time and the second time.

7. A method comprising:
   accessing existing digital content that includes a plurality of articles, each article having a title;
   receiving a list of article titles to be included in a complete version of digital content;
   comparing the list of article titles with the titles of the plurality of articles in the existing digital content;
   identifying, based at least in part on the comparing, one or more articles from the list of article titles that are not included in the existing digital content;
   obtaining the identified one or more articles using a computer network; and adding, by one or more processors, the identified one or more articles to the existing digital content to provide updated digital content.

8. The method of claim 7, further comprising determining a time available to prepare the updated digital content, and wherein the adding of the identified one or more articles to the existing digital content occurs prior to expiration of the time available to prepare the updated digital content.

9. The method of claim 7, further comprising sending the updated digital content to a user device.

10. The method of claim 7, further comprising:
   determining a time available to prepare the updated digital content; and
   sending the updated digital content to a user device within the time available.

11. The method of claim 7, wherein the updated digital content comprises an electronic newspaper.

12. The method of claim 11, further comprising managing subscriptions to the electronic newspaper for a plurality of user devices.

13. The method of claim 7, further comprising obtaining the existing digital content from a provider using the computer network.

14. The method of claim 7, further comprising:
   identifying extra content to be removed from the existing digital content based at least in part on comparing the list of article titles with the titles of the plurality of articles; and
   removing the extra content from the existing digital content.

15. The method of claim 7, further comprising formatting the updated digital content into a different format.

16. The method of claim 15, further comprising sending the updated digital content to a user device in the different format.

17. The method of claim 7, further comprising modifying a layout of the updated digital content.

18. The method of claim 17, wherein modifying the layout is performed by a collator.

19. The method of claim 7, further comprising rearranging the updated digital content.

20. The method of claim 7, further comprising rearranging the plurality of articles in the updated digital content.

21. The method of claim 7, wherein the comparing is performed manually.

22. The method of claim 7, wherein the identifying is performed manually.

23. The method of claim 7, wherein the accessing, receiving, comparing, identifying, obtaining and adding are performed manually by an operator using a computer.

24. The method of claim 7, wherein the existing digital content is a first edition of an electronic newspaper associated with a first time and the complete version of the digital content is a second edition of the electronic newspaper associated with a second time after the first time.

25. The method of claim 24, wherein the one or more articles are added to the electronic newspaper in between the first time and the second time.

26. A system for updating an electronic periodical that is not complete, the system comprising:
   a processor;
   memory in electronic communication with the processor;
   instructions stored in the memory, the instructions being executable to:
      obtain content for the electronic periodical from a provider, the obtained content for the electronic periodical including multiple articles, each article having a title;
      subsequent to obtaining the content for the electronic periodical, receive a list of article titles to be included in a complete electronic periodical;
      determine that the obtained content for the electronic periodical is not complete based at least in part on comparing the list of article titles with the titles of the articles in the obtained content for the electronic periodical;
      identify one or more articles to be added to the obtained content for the electronic periodical based at least in part on the comparing;
      obtain the one or more articles; and
      add the one or more articles to the obtained content for the electronic periodical to provide an updated electronic periodical.

27. The system of claim 26, wherein the instructions are further executable to determine a time available to update the obtained content for the electronic periodical, and wherein the adding of the one or more articles to the obtained content for the electronic periodical occurs prior to expiration of the time available to update the obtained content for the electronic periodical.

28. The system of claim 26, wherein the instructions are further executable to send the updated electronic periodical to a user device.

29. The system of claim 26, wherein the instructions are further executable to manage subscriptions to the electronic periodical for a plurality of user devices.

30. The system of claim 26, wherein the instructions are also executable to determine that a layout of the obtained content for the electronic periodical is to be changed.

31. The system of claim 26, wherein the instructions are further executable to:
   identify extra content to be removed from the obtained content for the electronic periodical based at least in part on comparing the list of article titles to be included in the complete electronic periodical with the titles of the articles in the obtained content for the electronic periodical; and
   remove the extra content from the obtained content for the electronic periodical.

32. The system of claim 26, wherein the instructions are further executable to format the updated electronic periodical into a different format.

33. The system of claim 32, wherein the instructions are further executable to send the updated electronic periodical to a user device in the different format.

34. The system of claim 26, wherein the instructions are further executable to modify a layout of the updated electronic periodical.

35. The system of claim 26, further comprising a collator to modify a layout of the updated electronic periodical.

36. The system of claim 26, wherein the instructions are further executable to rearrange the updated electronic periodical.

37. The system of claim 26, wherein the instructions are further executable to rearrange the multiple articles and the one or more articles in the updated electronic periodical.

38. A non-transitory computer-readable medium comprising executable instructions for:
   obtaining a reference source that provides a complete version of an electronic periodical;
   accessing a currently stored version of the electronic periodical that includes a plurality of articles;

comparing a layout of the currently stored version of the electronic periodical to a layout of the complete version of the electronic periodical provided by the reference source;

determining that the layout of the currently stored version of the electronic periodical is to be changed based at least in part on the comparing;

changing the layout of the currently stored version of the electronic periodical to provide an updated version of the electronic periodical; and sending the updated version of the electronic periodical to a plurality of subscribing user devices.

39. The non-transitory computer-readable medium of claim 38, further comprising executable instructions for:

determining that the currently stored version of the electronic periodical is not complete;

identifying additional content to be added to the currently stored version of the electronic periodical;

obtaining the additional content using a computer network; and adding the additional content to the currently stored version of the electronic periodical.

* * * * *